(12) United States Patent
Shaheen

(10) Patent No.: US 10,880,871 B2
(45) Date of Patent: Dec. 29, 2020

(54) METHOD AND APPARATUS FOR ASYMMETRICAL UP-LINK/DOWN-LINK PROTOCOL STACK AND FRAME STRUCTURE IN A 5G NR COMMUNICATION SYSTEM

(71) Applicant: Sharp Kabushiki Kaisha, Sakai (JP)

(72) Inventor: Kamel M. Shaheen, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/799,043

(22) Filed: Oct. 31, 2017

(65) Prior Publication Data
US 2018/0124767 A1  May 3, 2018

Related U.S. Application Data

(63) Continuation of application No. PCT/US2017/059054, filed on Oct. 30, 2017.
(Continued)

(51) Int. Cl.
*H04W 80/02* (2009.01)
*H04W 72/04* (2009.01)
(Continued)

(52) U.S. Cl.
CPC ....... *H04W 72/0406* (2013.01); *H04W 28/06* (2013.01); *H04W 28/065* (2013.01);
(Continued)

(58) Field of Classification Search
CPC . H04W 28/0406; H04W 28/06; H04W 80/02; H04W 80/04; H04W 80/08; H04W 28/065; H04W 72/0406; H04W 88/02
See application file for complete search history.

(56) References Cited

U.S. PATENT DOCUMENTS

2010/0260111 A1* 10/2010 Sung ............... H04L 69/14
  370/328
2012/0195327 A1* 8/2012 Kim ............... H04L 1/0072
  370/474

(Continued)

OTHER PUBLICATIONS

LG Electronics Inc., Segmentation and Concatenation in NR L2, 3GPP TSG-RAN WG2 Meeting #95bis, R2-166525, Kaohsiung, Taiwan, Oct. 10-Oct. 14, 2016 (Year: 2016).*

(Continued)

*Primary Examiner* — Brian P Cox
(74) *Attorney, Agent, or Firm* — Austin Rapp

(57) ABSTRACT

A 5G NR user equipment (UE) and 5G NR based station (gNB) for transmitting and receiving NR User Plane data traffic and NR Control Plane data are described. Both, the UE and gNB include processor memory in electronic communication with the processor. Instructions stored in the memory are executable to process received downlink (DL) packets according to receive Medium Access Control (MAC) Protocol and/or Received Radio Link Control (RLC) Protocol. The instructions are also executable to process uplink (UL) packets for transmission according to transmit MAC and/or RLC protocols. The Transmit MAC frame structure and/or RLC frame structure are/is different in formats than those from Receive MAC and/or RLC frame structure at each end (i.e., at the UE and/or at the gNB). In the Up-link (UL), the MAC CE is transmitted at the end of the frame while for the Down-link (DL) the MAC CE is transmitted at beginning of the frame.

6 Claims, 21 Drawing Sheets

NR Asymmetrical Protocol Structure

Related U.S. Application Data

(60) Provisional application No. 62/415,959, filed on Nov. 1, 2016.

(51) Int. Cl.
  *H04W 28/06* (2009.01)
  *H04W 80/04* (2009.01)
  *H04W 88/08* (2009.01)

(52) U.S. Cl.
  CPC ............ *H04W 80/02* (2013.01); *H04W 80/04* (2013.01); *H04W 88/08* (2013.01)

(56) References Cited

U.S. PATENT DOCUMENTS

| | | | | |
|---|---|---|---|---|
| 2015/0163695 | A1* | 6/2015 | Li | H04W 12/06 370/328 |
| 2017/0222871 | A1* | 8/2017 | Yu | H04L 41/0803 |
| 2018/0227219 | A1* | 8/2018 | Zhang | H04W 28/0273 |

OTHER PUBLICATIONS

Ericsson, "Report from [95#26] Concatenation," 3GPP TSG-RAN WG2 #95bis, Kaohsiung, Taiwan, R2-166904, Oct. 10-14, 2016 (Year: 2016).*

International Search Report and Written Opinion issued for PCT Application No. PCT/US2017/059054 dated Jan. 30, 2018.

3GPP TS 36300 V13.4.0, Evolved Universal Terrestrial Radio Access (E-UTRA) and Evolved Universal Terrestrial Radio Access Network (E-UTRAN); Overall description; Stage 2, (Release 13) Jun. 2016.

Ericsson, "Report from [95#26] Concatenation", 3GPP TSG RAN WG2 #95bis, Kaohsiung, Taiwan, R2-166904, Oct. 14, 2016.

Samsung, "Concatenation for NR", 3GPP TSG RAN WG1 Meeting #95bis, Kaohsiung, Taiwan, R2-166475, Oct. 14, 2016.

Huawei, HiSilicon, "Analysis of L2 Segmentation and Concatenation in NR," 3GPP TSG-RAN WG2 Meeting #95bis, Kaohsiung, Taiwan, R2-166196, Oct. 14, 2016.

Ericsson, Huawei, ZTE, "Way forward for concatenation discussion," R2-167190, 2016.

Samsung, et al. "On concatenation in NR", 3GPP TSG RAN WG2 Meeting #95bis, Kaohsiung, Taiwan, R2-167199, Oct. 14, 2016.

Nokia, Alcatel-Lucent Shanghai Bell, "MAC concatenation," 3GPP TSG RAN WG1 Meeting #95bis, Kaohsiung, Taiwan, R2-166160, Oct. 14, 2016.

Intel Corporation, "NR user plane architecture to ease Tx processing," 3GPP TSG-RAN WG2 Meeting #95bis, Kaohsiung, Taiwan, R2-166884, Oct. 14, 2016.

Ericsson, "Placement of RLC/MAC headers", 3GPP TSG RAN WG2 #95bis, Kaohsiung, Taiwan, R2-166824, Oct. 14, 2016.

NTT Docomo, Inc., "Discussion on L2 protocol for NR," 3GPP TSG RAN WG2 Meeting #95bis, Kaohsiung, Taiwan, R2-166544, Oct. 14, 2016.

ITRI, "Non-Real-Time Segmentation and Concatenation for NR," 3GPP TSG-RAN WG2 Meeting #95bis, Kaohsiung, Taiwan, R2-166483, Oct. 14, 2016.

ZTE Microelectronics, "Consideration on the pre-concatenation in RLC for NR," 3GPP TSG-RAN WG2 Meeting #95bis, Kaohsiung, Taiwan, R2-166347, Oct. 14, 2016.

LG Electronics Inc., "Segmentation and Concatenation in NR L2," 3GPP TSG-RAN WG2 Meeting #95bis, Kaohsiung, Taiwan, R2-166525, Oct. 14, 2016.

Panasonic, "User Plane Architecture and high level Layer 2 functions," 3GPP TSG RAN WG2 Meeting #95bis, Kaohsiung, Taiwan, R2-166110, Oct. 14, 2016.

Fujitsu, "Considerations on the segmentation function in NR", 3GPP TSG RAN WG1 Meeting #95bis, Kaohsiung, Taiwan, R2-166488, Oct. 14, 2016.

Samsung, "Segment Offset-based Segmentation for NR", 3GPP TSG RAN WG2 Meeting #95bis, Kaohsiung, Taiwan, R2-166511, Oct. 14, 2016.

Nokia, Alcatel-Lucent Shanghai Bell, "Segmentation in NR," 3GPP TSG RAN WG2 Meeting #95bis, Kaohsiung, Taiwan, R2-166355, Oct. 14, 2016.

MediaTek Inc., "Segmentation and Concatenation for NR UP", 3GPP TSG RAN WG2 Meeting #95bis, Kaohsiung, Taiwan, R2-166990, Oct. 14, 2016.

Nokia, Alcatel-Lucent Shanghai Bell, "On usage of PDCP SN at RLC for NR," 3GPP TSG RAN WG1 Meeting #95bis, Kaohsiung, Taiwan, R2-166159, Oct. 14, 2016.

Nokia, Alcatel-Lucent Shanghai Bell, "Using Count over the air for PDCP PDU," 3GPP TSG RAN WG2 Meeting #95bis, R2-166158, Oct. 14, 2016.

Qualcomm Incorporated, Convida Wireless, "User Plane L2 function analysis", 3GPP TSG-RAN WG2 Meeting #94, Nanjing, China, R2-164124, May 27, 2016.

Nokia, Alcatel-Lucent Shanghai Bell, CATT, Media Tek Inc., NEC, NTT Docomo, Inc., ZTE, "MAC CEs placement," 3GPP TSG-RAN WG2 Meeting #98, Hangzhou, China, R2-1705073, May 15, 2017.

\* cited by examiner

US 10,880,871 B2

METHOD AND APPARATUS FOR ASYMMETRICAL UP-LINK/DOWN-LINK PROTOCOL STACK AND FRAME STRUCTURE IN A 5G NR COMMUNICATION SYSTEM

RELATED APPLICATIONS

This application is related to and claims priority from U.S. Provisional Patent Application No. 62/415,959, entitled "ASYMMETRICAL CONFIGURABLE RADIO LINK CONTROLLER," filed on Nov. 1, 2016, which is hereby incorporated by reference herein, in its entirety.

TECHNICAL FIELD

The present disclosure relates generally to communication systems. More specifically, the present disclosure relates to an asymmetrical method and apparatus for ASYMMETRICAL up-link/down-link protocol stack and frame structure in a 5G NR communication system.

BACKGROUND

Wireless communication devices have become smaller and more powerful in order to meet ever-increasing consumer demands and to improve portability and convenience. Consumers have become critically dependent upon wireless communication devices and have come to expect ultra-reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, the current design for wireless communication devices and base stations use symmetrical UL/DL protocol stacks/procedures and frame structure (frame formats) to communicate with one or more devices. However, this communication structure used offers a limited flexibility and/or efficiency by ignoring simple facts of physics. For example, computation capacity varies between the base station and end-user device (UE). While the UE has limited space to implement its complicated hardware, which limits the processing power of its computation processor(s) and the capacity/size of the feasible storage, the base station (e.g., 5G NR gNB) has unlimited space for more sophisticated powerful processing systems and storage facilities. This simple fact renders the use of symmetrical protocol structure/procedures and frame formats in both communication directions (i.e., UL and DL) inefficient.

While the UE implementations need to be simplified in both transmission and reception in order to optimize the limited computations and storage resource, these restrictions are not crucial for the BS in both operations (TX/RX). The design principal should be changed to address this gap resulting from the asymmetrical capabilities of the BS and UE. As illustrated by this discussion, systems and methods that improve communication flexibility and/or efficiency may be beneficial.

DETAILED DESCRIPTION

Figure 1:
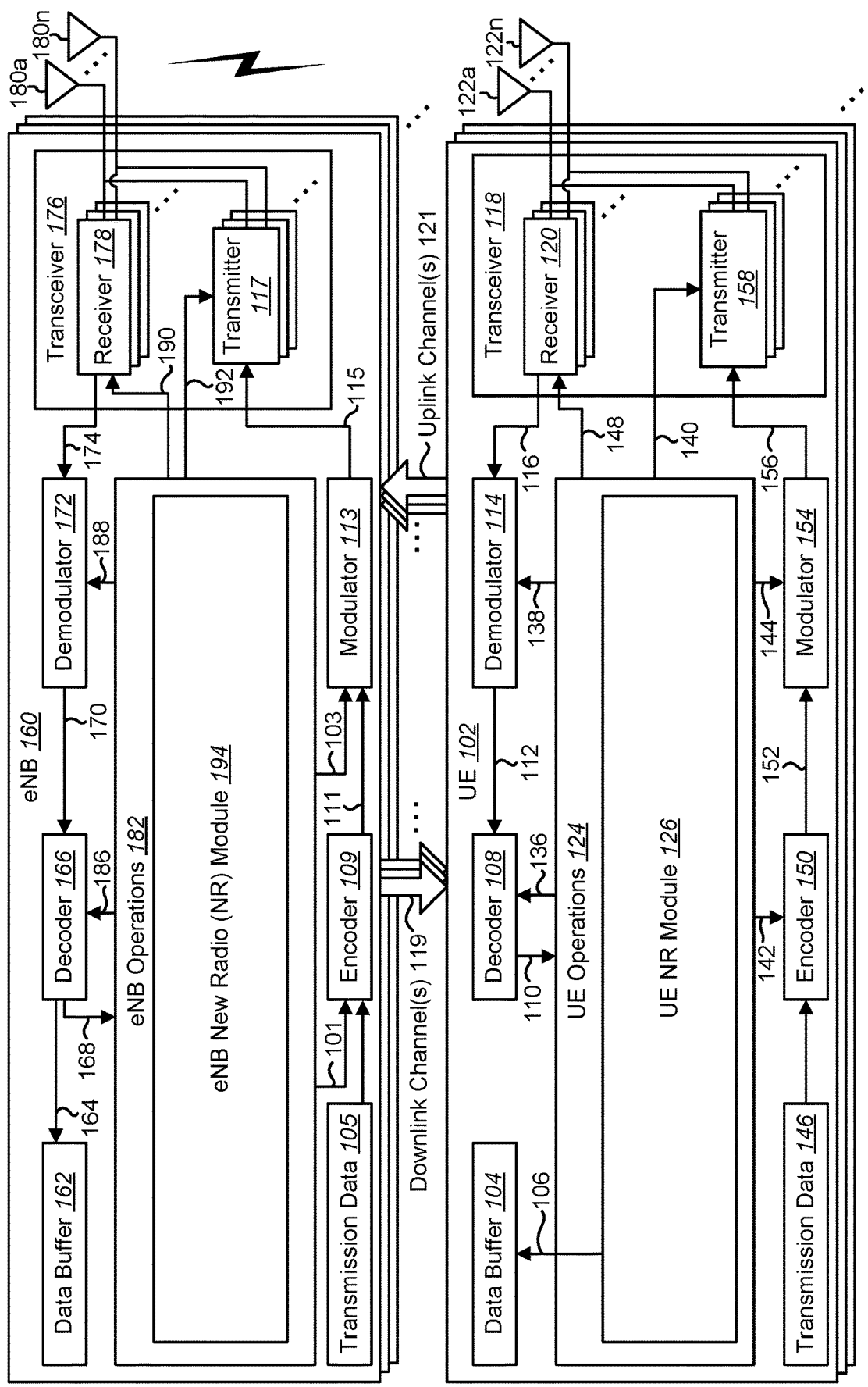
FIG. 1 is a block diagram illustrating one implementation of one or more evolved NodeBs (eNBs) and one or more user equipments (UEs) in which systems and methods for an ASYMMETRICAL up-link(UL)/down-link (DL) protocol stack and frame structure may be implemented.

A 5G NR user equipment (UE) for transmitting and receiving NR User Plane data traffic and NR Control Plane data is described. The UE includes a processor and memory in electronic communication with the processor. Instructions stored in the memory are executable to process received downlink (DL) packets according to a receive Medium Access Control (MAC) protocol, and/or a receive Radio Link Control (RLC) protocol, and/or a receive Packet data Converge Protocol (PDCP). The instructions are also executable to process uplink (UL) packets for transmission according to transmit MAC and/or RLC protocols. A transmit MAC and/or RLC frame structure and/or PDCP frame structure are/is different in formats than those from a receive MAC and/or RLC frame structure and/or PDCP frame structure.

A transmit/receive MAC processing protocol and/or transmit/receive MAC frame structure in the UE may be different from that in a transmit/receive MAC processing protocol and/or transmit/receive frame structure in a base station. A transmit/receive RLC processing protocol and/or RLC transmit/receive frame structure in the UE may be different from that in a transmit/receive RLC processing protocol and/or transmit/receive frame structure in a base station. A transmit/receive PDCP processing protocol and/or RLC transmit/receive frame structure in the UE may be different from that in a transmit/receive PDCP processing protocol and/or RLC transmit/receive frame structure in a base station.

A transmit RLC protocol in the UE may not perform concatenation while a transmit RLC protocol in a base station may perform concatenation.

The transmit MAC protocol in the UE may construct MAC sub protocol data units (PDUs) including headers and MAC CE at a back end of the MAC frame.

The transmit MAC protocol in a base station may construct MAC subPDU(s) including headers and MAC CE at the beginning of the MAC frame.

The transmit MAC protocol in the UE may construct MAC subPDU(s) including headers and MAC CE at a back end of the MAC frame while the transmit MAC protocol in a base station may construct MAC subPDU(s) including headers and MAC CE at the beginning of the MAC frame. A MAC header may contain information regarding construction of MAC PDU comprising position of different elements in the MAC frame including MAC CE. Information comprising a bit map of different RLC PDUs within the MAC frame.

A 5G NR Base Station (gNB) for transmitting and receiving NR User Plane data traffic and NR Control Plane data is also described. The gNB includes a processor and memory in electronic communication with the processor. Instructions stored in the memory are executable to process received DL packets according to a receive MAC protocol, and/or a receive RLC protocol, and/or receive PDCP. The instructions are also executable to process UL packets for transmission according to transmit MAC and/or RLC protocols. A transmit MAC and/or RLC frame structure and/or PDCP frame structure are/is different in formats than those from a receive MAC and/or RLC frame structure and/or PDCP frame structure.

A method for transmitting and receiving NR User Plane data traffic and NR Control Plane data by a 5G NR UE is also described. The method includes processing received DL packets according to a receive MAC protocol, and/or a receive RLC protocol, and/or receive PDCP. The method also includes processing UL packets for transmission according to transmit MAC and/or RLC protocols. A transmit MAC and/or RLC frame structure and/or PDCP frame structure are/is different in formats than those from a receive MAC and/or RLC frame structure and/or PDCP frame structure.

A method for transmitting and receiving NR User Plane data traffic and NR Control Plane data by a 5G NR gNB is also described. The method includes processing received DL packets according to a receive MAC protocol, and/or a receive RLC protocol, and/or receive PDCP. The method also includes processing UL packets for transmission according to transmit MAC and/or RLC protocols. A transmit MAC and/or RLC frame structure and/or PDCP frame structure are/is different in formats than those from a receive MAC and/or RLC frame structure and/or PDCP frame structure.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, an LTE based base station is typically referred to as a Node B, an evolved Node B (eNB), a home enhanced or evolved Node B (HeNB) or some other similar terminology. In 5G NR, the base station is referred to as gNB. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. A gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

It should be noted that the term "concurrent" and variations thereof as used herein may denote that two or more events may overlap each other in time and/or may occur near in time to each other, all within a given time interval. Additionally, "concurrent" and variations thereof may or may not mean that two or more events occur at precisely the same time.

Currently, 3GPP is developing the Next Generation wireless technology known as 5G, which includes the introduction of New Radio (NR) (also referred to as new radio access technology). Several architectures and possible deployment scenarios are proposed and agreed on how the NR will be integrated into existing Long Term Evolution (LTE) systems.

The frame structure used in LTE MAC and LTE RLC is symmetrically reciprocal. In other words, the same structure is used in the base station (BS) (also referred to herein as the eNB) and the UE.

As described in Section 6 of 3GPP TS 36.300.V13.4.0, the LTE Layer 2 protocol is split into the following sublayers: Medium Access Control (MAC), Radio Link Control (RLC) and Packet Data Convergence Protocol (PDCP).

The purpose of concatenation is to aggregate packets from multiple logical channels in a transmission unit for efficient utilization of the air interface. A MAC protocol data unit (PDU) should be able to carry multiple upper layer packets. The concatenation function requires input from MAC layer scheduling. This adds delay and buffering of data. The legacy RLC layer concatenation across logical channels requires just-in-time knowledge of available capacity for a logical channel, which may cause implementation difficulty in high throughput due to self-contained frame design. The MAC layer provides a concatenation function along with multiplexing and demultiplexing.

3GPP is currently working on reducing the complexity of the LTE-based Radio Link Control (RLC) protocol. The removal of the "Concatenation" function is under investigation. Also, the formats, the location, and the size of RLC and Media Access Control (MAC) headers are being considered. However, all technical solutions proposed are based on the assumption that the RLC and MAC formats will be the same at the New Radio Base Station (NR gNB) and User Equipment (UE). These solutions are based on specific vendors implementations point of view. For example, mobile manufacturers are in favor of removing concatenations to simplify UE implementations given the limitations imposed by the memory size and processer capabilities while the base station manufacturers are not impacted by mobile limitations. The base station manufacturers are proposing solutions that can enhance the processing of the packets and reduce delay, yet it is not enough for the mobile manufacturers.

A solution is to have two solutions (asymmetrical). One solution may be for each transmitter side. For instance, one solution may be for the UE TX, which satisfies the hardware limitations. The other solution may be for the NR gNB TX, which enhances the delay performance in the NR gNB and simplifies the receiver (i.e., UE reception) structure at the UE.

The systems and methods described herein introduce a solution to address the complexity of implementation of RLC and MAC in the NR UE and BS. The described systems and methods have two implementation solutions (Asymmetrical) for the two transmitter-sides (TX). One arrangement for the NR UE TX, which satisfy hardware limitations. The second arrangement is for the NR Base Station (gNB), which enhances the delay performance in the NR gNB and further simplifies the receiver (i.e., UE reception) structure at the UE.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for an ASYMMETRICAL UP-Link/Down-Link Protocol Stack and Frame Structure may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n. In the context of 5G NR, the eNB 160 may also be referred to as a 5G NR base station (gNB).

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include a UE new radio (NR) module 126.

Figure 4:
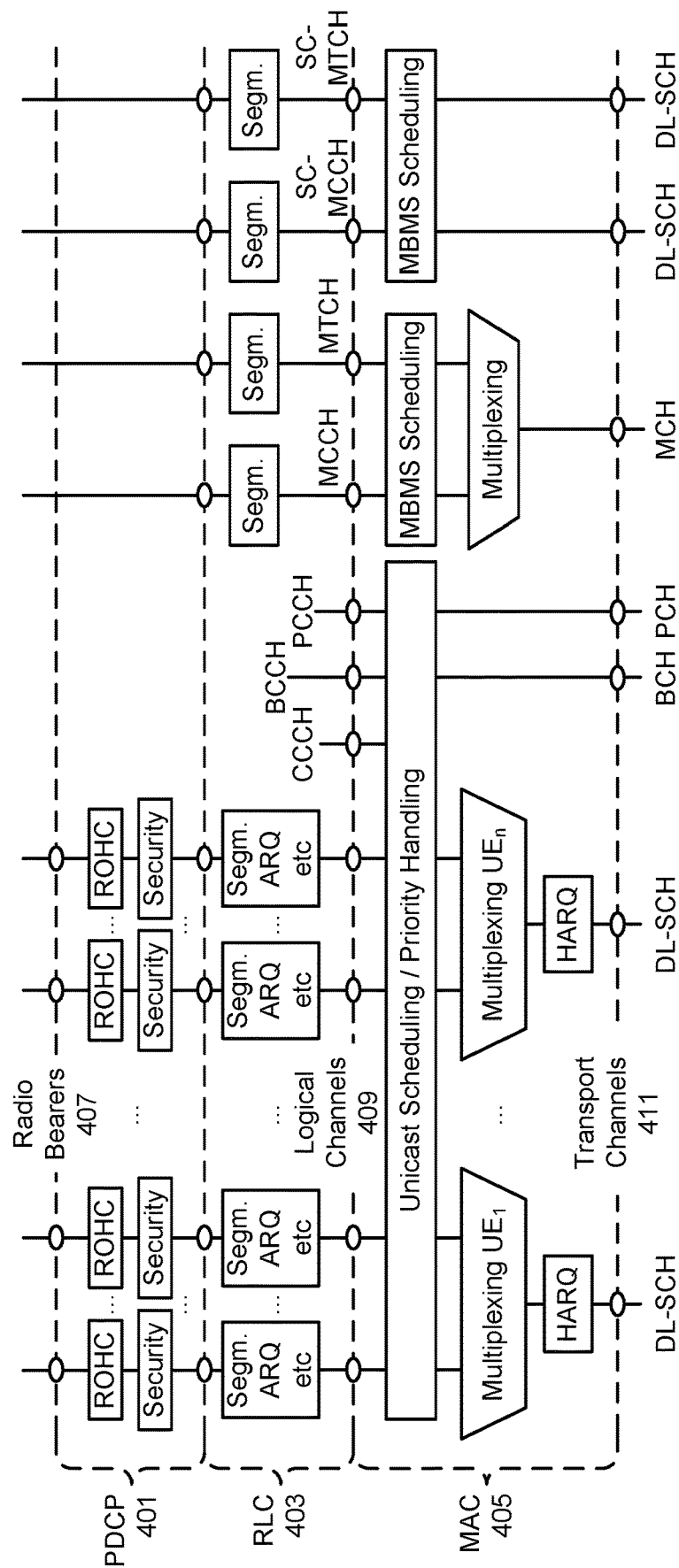
FIG. 4 is a block diagram illustrating a Protocol structure for downlink (DL)
Figure 5:
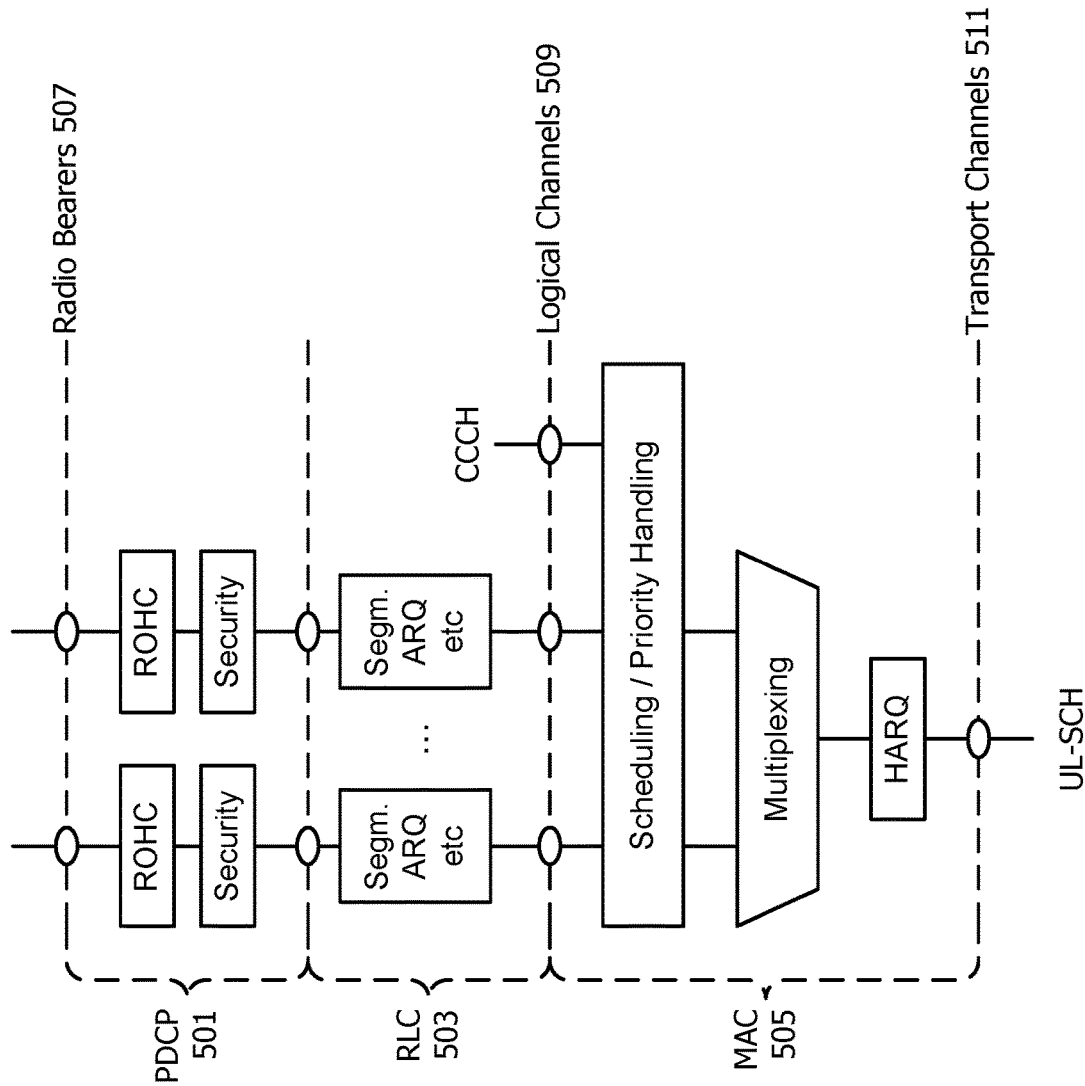
FIG. 5 is a block diagram illustrating a Protocol structure for uplink (UL)

As described in Section 6 of 3GPP TS 36.300.V13.4.0, the LTE Layer 2 protocol is split into the following sublayers: Medium Access Control (MAC), Radio Link Control (RLC) and Packet Data Convergence Protocol (PDCP). This subclause gives a high level description of the Layer 2 sublayers in terms of services and functions. FIGS. 4 and 5 depict the PDCP/RLC/MAC architecture for downlink, uplink and sidelink.

It should be noted that the eNB 160 may not be able to guarantee that a L2 buffer overflow will never occur. If such overflow occurs, the UE 102 may discard packets in the L2 buffer.

It should also be noted that for a NB-IoT UE that supports Control Plane Cellular IoT (CIoT) Evolved Packet System (EPS) optimizations only, PDCP is bypassed. For a NB-IoT UE that supports Control Plane CIoT EPS optimizations and User Plane CIoT EPS optimizations, PDCP is not used until AS security is activated.

In summary, the Layer 2 functionalities can be listed as shown in Table 1.

TABLE 1

| Protocol | Legacy U-plane functions |
|---|---|
| PDCP | IP header compression and encryption of user data (security) |
|  | In-order delivery to upper layer and duplicate detection |
|  | Packet-level retransmissions across links (upon connection re-establishment) |
| RLC | Concatenation |
|  | Segmentation and reassembly |
|  | In-order delivery to upper layer and duplicate detection |
|  | Byte-level retransmissions (AM only) |
| MAC | Priority handling between logical channels |
|  | Concatenation, (De)multiplexing of MAC SDUs and padding |

Figure 3:
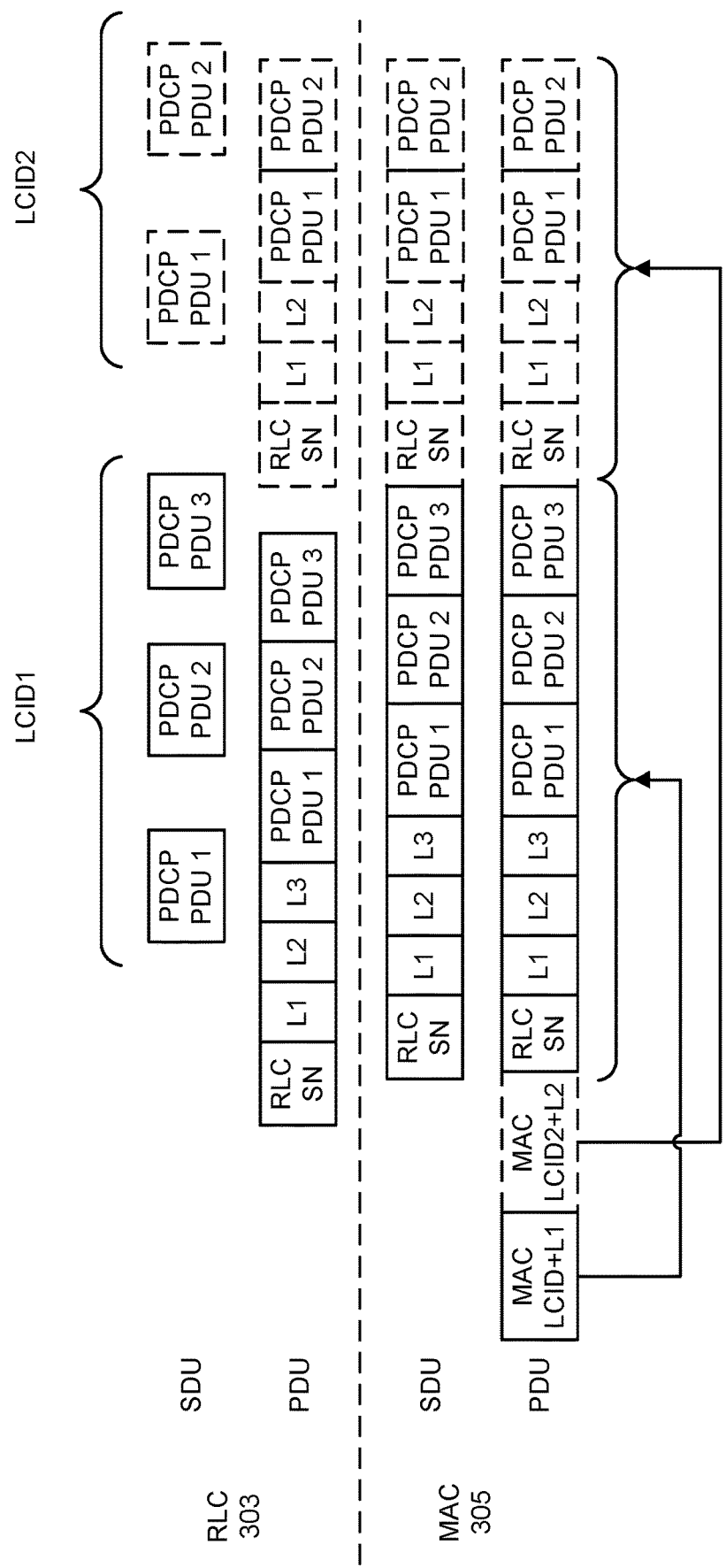
FIG. 3 is a block diagram illustrating a Radio Link Control (RLC) and Medium Access Control (MAC) structure, where the MAC header including MAC control element (CE) is transmitted at the front of a frame suitable for the DL according to the systems and methods described herein.

The purpose of concatenation is to aggregate packets from multiple logical channels in a transmission unit for efficient utilization of the air interface. An example of concatenation is depicted in FIG. 3.

A MAC PDU should be able to carry multiple upper layer packets. The concatenation function requires input from MAC layer scheduling. This adds delay and buffering of data. The legacy RLC layer concatenation across logical channels requires just-in-time knowledge of available capacity for a logical channel, which may cause implementation difficulty in high throughput due to self-contained frame design. The MAC layer provides a concatenation function along with multiplexing and demultiplexing.

3GPP is currently working on reducing the complexity of LTE based Radio Link Control (RLC) protocol. The removal of the "concatenation" function is under investigation. Also, the formats, the location, and the size of RLC and Media Access Control (MAC) headers are being considered. However, all technical solutions proposed are based on the assumption that the RLC and MAC formats will be the same at the New Radio Base Station (NR gNB) and User Equipment (UE).

Mobile manufacturers are in favor of removing concatenations to simplify UE implementations given the limitations imposed by the memory size and processor capabilities. Base Station manufacturers are not impacted by mobile limitations. The Base station manufacturers are proposing solutions that can enhance the processing of the packets and reduce delay yet it is not enough for the mobile manufacturers.

LTE UP design principles are described herein. In LTE, RLC performs concatenation of PDCP PDUs. When the transmitter knows the TB-size, the MAC performs Logical Channel Prioritization (LCP) to determine how much data each RLC-entity should transmit. Each RLC entity provides one RLC PDU containing one or more RLC SDUs. For each RLC Service Data Unit (SDU) ending in the RLC PDU a corresponding L-field is added, which enables the receiver to extract the SDUs.

If the last contained RLC SDU does not fit entirely into the RLC PDU, it is segmented. In other words, the remainder of the RLC SDU will be sent in the subsequent RLC PDU(s). Whether the first (or last) byte of the RLC PDU corresponds to the first (or last) byte of the RLC SDU is indicated by the "Framing Info" flags (2 bit). Other than that, segmentation does not have any additional overhead.

In order to re-establish the original order of the data and to detect losses, the RLC sequence number (SN) is added to the RLC PDU header. The MAC multiplexes the RLC PDUs for different LCIDs and adds a corresponding sub-header with Logical Channel ID (LCID) and L-field. A high level illustration of the TB structure below is depicted in FIG. 3.

Reasons why the structure of FIG. 3 was chosen for LTE includes the following: Low overhead even with low physical layer data rates. Low overhead even for services generating low data rates (e.g. VoIP) Very low signaling overhead for ARQ. Sequence number space does not increase with the L1 data rates. The header-information is not interlaced with the data and a receiver can find the header-information with few memory accesses (one per RLC-entity).

Possible limitations of the structure of FIG. 3 include the following. Creating a PDU is an iterative process since the size of the control information (header) depends, for example, on the number of SDUs in that PDU. This iterative process takes time until the transmission of the MAC PDU may start. Since the beginning of the TB contains the (MAC- and first RLC-) header, the transmitter cannot construct (and start sending to the physical layer (PHY)) the TB prior to knowing the TB-size.

Different approaches to concatenation may be considered. The processing of both the transmitter and the receiver when evaluating whether to divert from the LTE-baseline may be considered.

In an approach, depending on the TB sizes and QoS requirements supported by NR, segmentation may be disabled per radio bearer for services with small packets. In another approach, concatenation in RLC shall be kept as it is in LTE. A fixed size RLC header may be important from processing point of view. The RLC concatenation may be after UL grant received and tis process is quite heavy and not efficient for high data rate. Also, with fixed size of the RLC header may make pre-construction easy.

In another approach, The MAC header may have to be created after the UL grant is received. The precomputation problem may be resolved by the header design rather than moving concatenation.

Figure 6:
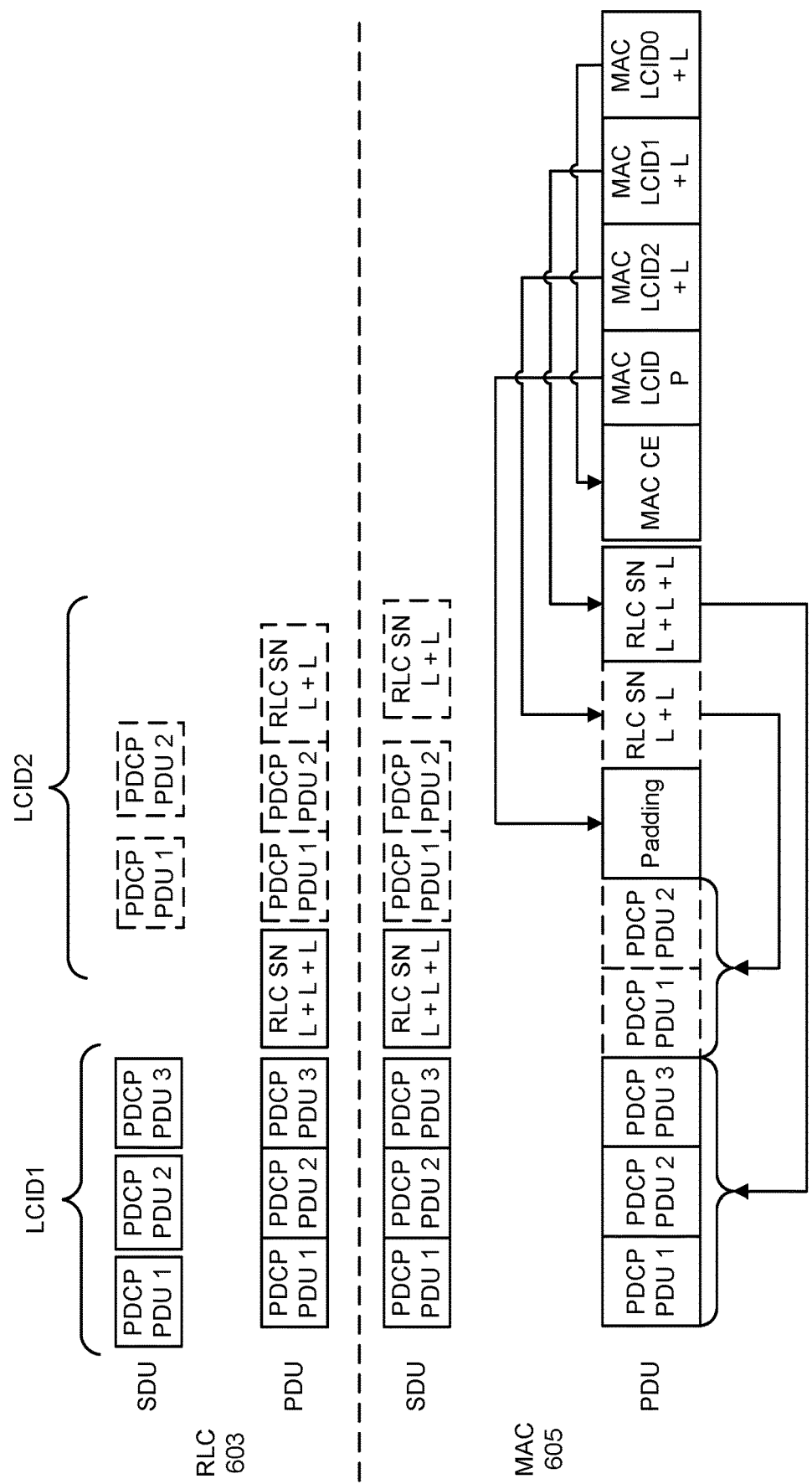
FIG. 6 is a block diagram illustrating an approach to concatenation where the MAC header including MAC CE is transmitted at the end of the MAC Frame suitable for the UL according to the systems and methods described herein.

An approach to concatenation is depicted in FIG. 6. In this approach, concatenation is like in LTE, but dynamic parts (e.g., headers and MAC control elements (CEs)) are in the end of the TB. RLC headers may be appended after the data of that RLC PDU.

Considerations on the segmentation function in NR are also described. In one approach, segmentation may be in the lowest layer (i.e., MAC). Alternatively, segmentation may be in RLC. Segmentation may be per logical channel at RLC.

In another approach, segmentation may not be configured. If segmentation is to be avoided, in some cases it might be better to do it at transport block level. With this approach, the network may need to provide a large grant. Segmentation may be needed based on grant size, but there may also be grant free transmission and in this case no segmentation could be configured. In the case of grant free transmission, the block size is also given from network.

Segmentation may be based on rules at transport level such as if the block is larger than a certain size.

For NR, the segmentation function may only be placed in the RLC layer as in LTE. A segment offset (SO)-based segmentation can be considered for both segmentation and resegmentation as a baseline in NR user plane to support high data rate. This does not imply anything about the location of concatenation.

Regarding usage of PDCP SN at RLC, there may be different approaches, for a split bearer, each RLC PDU could indicate the following SN in case there is a gap so that the receiver can know what to expect. The transmitter could also indicate that the buffer is empty. RLC might receive a scheduling request (SR) with a gap but it may know it did not transmit it. A SN for PDCP control PDU may be needed. An RLC SN could be introduced just for a split bearer case.

The COUNT transmission is also discussed. COUNT may be used over the air for the PDCP PDU. The COUNT may be disabled for some services such as voice. Voice is the biggest use case as this is where Hyper Frame Number (HFN) desync occurs today. HFN desync is often due to poor implementations in network or UE 102. In an approach, HFN desync can be resolved by using a longer SN. A full COUNT reduces processing overhead, and additionally addresses the out of sync problem. This is beneficial for a high data rate case. HFN processing may not provide a large gain and if configurable then UEs will have to cope with the worst case. There may be more complexity with inter-radio access technology (RAT) change between LTE and NR.

There may be several interpretations of what it means to "remove concatenation from RLC." The different possible structures are identified herein. The impacts of these different alternatives are also discussed herein.

A first alternative (Alternative 1) is described in connection with FIG. 7. In Alternative 1, the RLC transmitter does not concatenate several RLC SDUs into one RLC PDU. Instead, the MAC multiplexes RLC PDUs (which each contain one RLC SDU (or segment)).

In this alternative it is assumed that the RLC transmitter side still adds an SN per RLC PDU. In order to concatenate (i.e., multiplex) several RLC PDUs into one MAC PDU, the MAC transmitter adds an LCID and L-field for each RLC PDU. In this alternative, segmentation is performed in RLC, as in LTE today.

The impact of Alternative 1 is as follows. The RLC headers (SNs) are interlaced with the data. Hence the RLC receiver must parse the whole TB to extract the RLC SNs. This may require many sequential calls to the memory where the TB is stored upon reception. The MAC subPDU(s) including headers and MAC CE in the beginning of the TB depend on the outcome of LCP/multiplexing and cannot be created before the grant has been processed. Hence, data cannot be fed to PHY before the headers are constructed. This results in additional overhead due to additional MAC sub-headers (one per IP-packet compared to one per group of concatenated IP-packets). ARQ is performed per IP-packet (rather than groups of IP-packets), which increases ARQ processing and header overhead.

Figure 8:
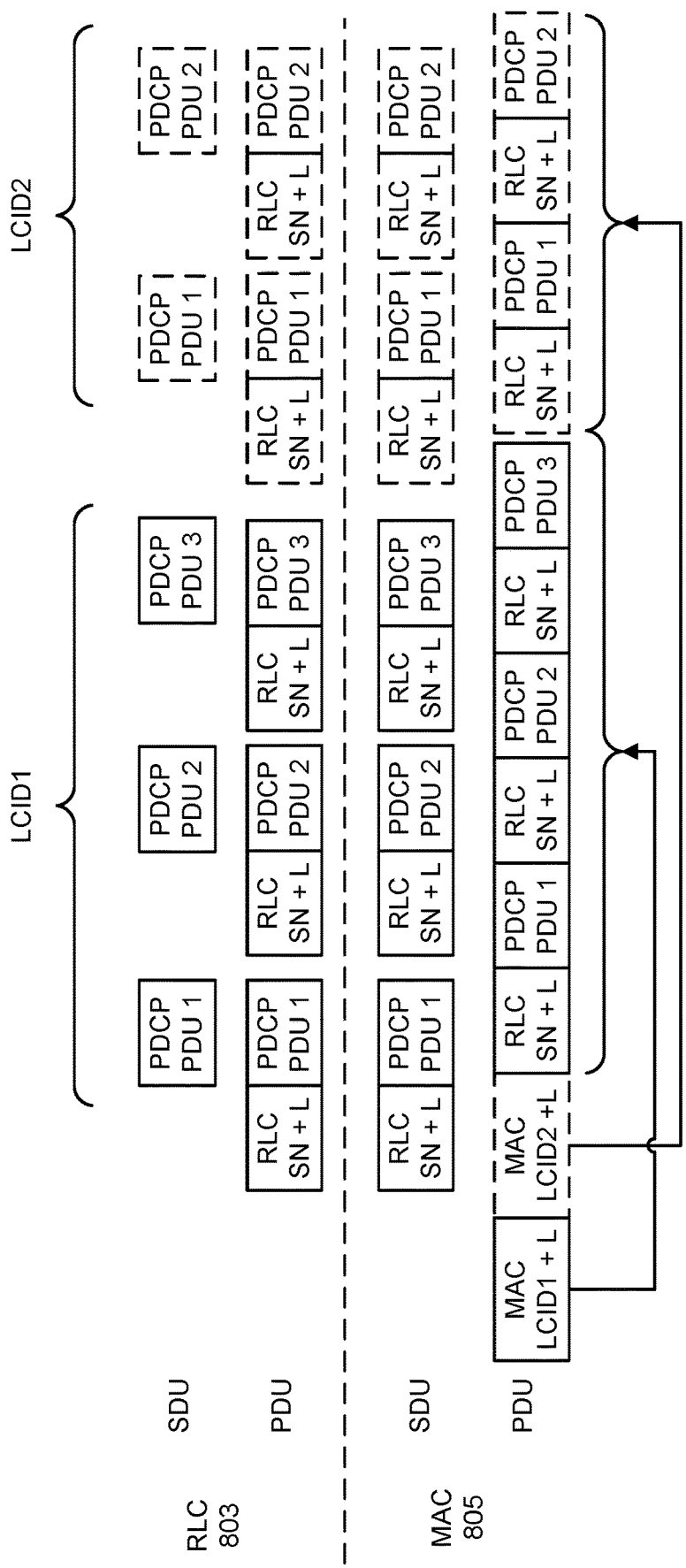
FIG. 8 is a block diagram illustrating a second alternative (Alternative 2) for removing concatenation from RLC (MAC CE is placed at the beginning of the MAC frame suitable for DL)

A second alternative (Alternative 2) is depicted in FIG. 8. In this alternative, the RLC PDU header contains not only the RLC SN but also an L-field per SDU. The MAC transmitter indicates in the MAC header the LCID and the length-field for the set of PDUs of each RLC-entity. In this alternative, segmentation is performed in RLC, as in LTE today.

The impact of Alternative 2 is as follows. RLC SNs and L-fields are both interlaced with the data, which forces the receiver to parse the whole TB to extract the SNs and L-fields. This increases decoding delay (e.g., due to many sequential calls to the memory). Additional overhead occurs due to additional SN-fields in RLC (one per IP packet instead of one per group of concatenated IP-packets). The MAC subPDU(s) including headers and MAC CE in the beginning of the TB depend on the outcome of LCP/multiplexing and cannot be created before the grant has been processed. Hence, data cannot be fed to PHY before the headers are constructed. ARQ is performed per IP-packet (rather than groups of IP-packets), which increases ARQ processing and header overhead.

Figure 9:
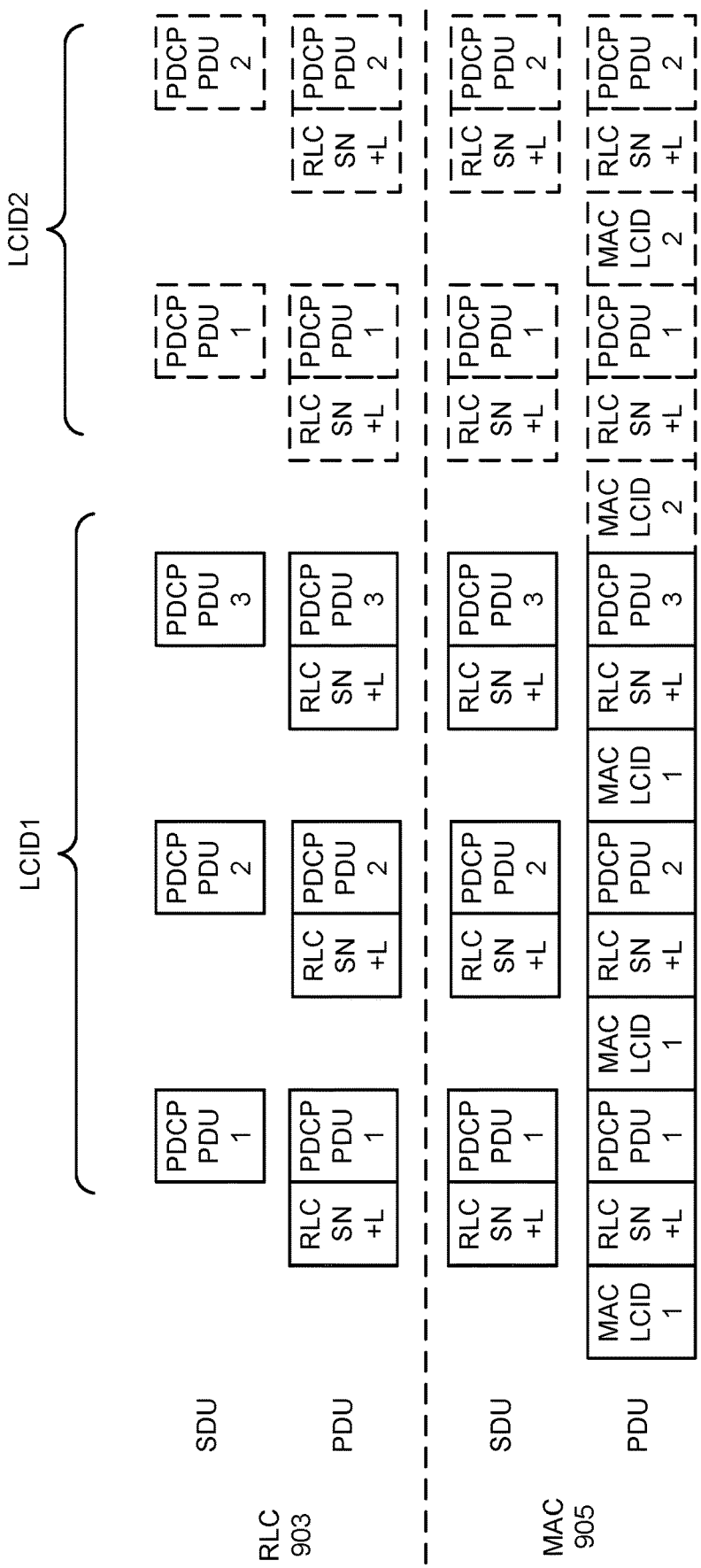
FIG. 9 is a block diagram illustrating a third alternative (Alternative 3) for removing concatenation from RLC (MAC CE is placed at the beginning of the MAC frame for DL)

A third alternative (Alternative 3) is depicted in FIG. 9. As in alternative 2, with Alternative 3, the RLC transmitter adds SN and L-field for each RLC SDU. To demultiplex, the MAC adds an LCID per MAC SDU. In this alternative, segmentation is performed in RLC, as in LTE today. In an implementation of this alternative, the L-fields (and possibly also SNs) are included in the MAC sub-headers instead of in the RLC header.

The impact of Alternative 3 is as follows. If the transport block (TB) provides enough room for an entire MAC SDU, the beginning of the TB does not depend on the outcome of LCP/multiplexing and hence the beginning of the TB can be sent to PHY directly when a grant is decoded which may speed up grant to transmission delay. But when an RLC SDU is segmented, the transmitter needs to modify the header information (framing information (FI) field) of the segmented RLC PDUs, the transmission of an RLC/MAC PDU segment to lower layers may start only after determining the FI. Also, assuming that MAC CEs are still placed in the beginning of the MAC PDU, these need to be computed before starting the transmission of the MAC PDU towards L1. This placement of the MAC CE at the beginning of the MAC frame is particularly beneficial for Down-link (DL) processing.

RLC SNs and L-fields as well as MAC LCID fields are interlaced with the data forcing the receiver to parse the whole TB to extract these fields. This increases decoding delay (e.g., due to many sequential calls to the memory). ARQ is performed per IP-packet (rather than groups of IP-packets), which increases ARQ processing and header overhead.

Figure 10:
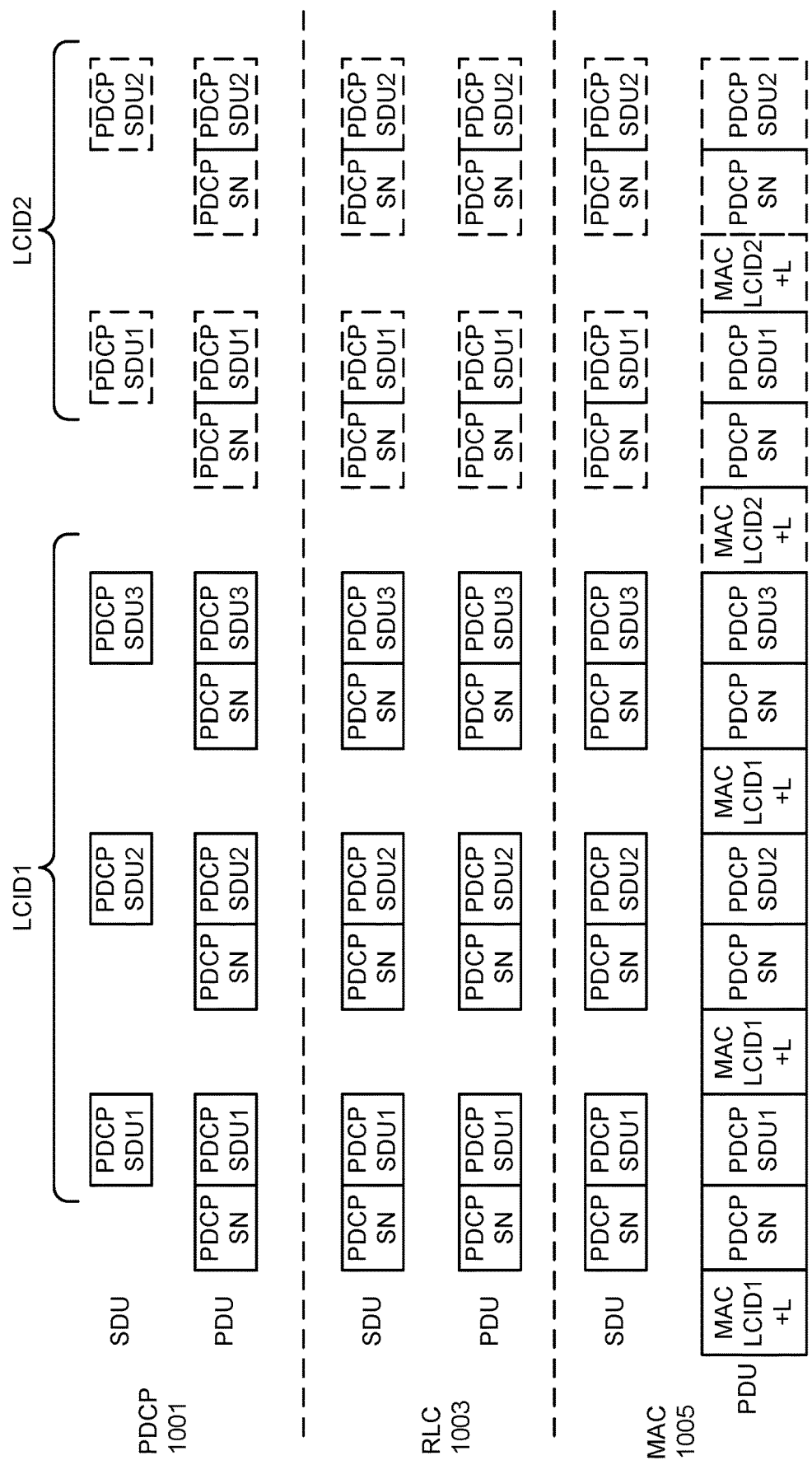
FIG. 10 is a block diagram illustrating a fourth alternative (Alternative 4) for removing concatenation from RLC (MAC CE is placed at the beginning of the MAC frame suitable for DL)

A fourth alternative (Alternative 4) is depicted in FIG. 10. In this alternative, the RLC transmitter does not concatenate several RLC SDUs into one RLC PDU. Instead, the MAC multiplexes RLC PDUs (which each contain one RLC SDU (or segment)).

In this alternative it is assumed that the PDCP transmitter adds a PDCP SN to the PDCP PDU, but RLC transmitter does not add an SN to the RLC PDU. In this alternative, the MAC transmitter may perform segmentation for the first and last MAC SDUs included in the MAC PDU, in which case the MAC transmitter adds a segmentation info (SI) field for the MAC SDU segment. In order to concatenate (i.e., multiplex) several RLC PDUs into one MAC PDU, the MAC transmitter adds an LCID and L-field for each RLC PDU.

The impact of Alternative 4 is as follows. If the transport block (TB) provides enough room for an entire MAC SDU, the beginning of the TB does not depend on the outcome of LCP/multiplexing and hence the beginning of the TB can be sent to PHY directly when a grant is decoded. This may speed up a grant to transmission delay. But when an RLC SDU is segmented the transmitter needs to modify the header information (FI field) of the segmented RLC PDUs. The transmission of an RLC/MAC PDU segment to lower layers may start only after determining the FI. Also, assuming MAC CEs are still placed in the beginning of the MAC PDU, these need to be computed before starting the transmission of the MAC PDU towards L1. This is particularly beneficial for Down-link (DL) processing.

Segmentation may not work in this alternative as it is described now. There is a need to assign sequence numbers after segmentation to allow the transmitter to reassemble the packets in the correct order. But in this alternative, there are no SNs assigned after segmentation. In this alternative, there would only be an SN (the PDCP SN) in the first segment, which means that all subsequent segments will not be distinguishable.

ARQ does not work since RLC (where ARQ is performed) does not have any sequence numbers. At a first glance, one could consider that RLC "peeks" into and uses the PDCP SNs, but this does not work for split bearers.

L-fields (MAC LCID fields) are interlaced with the data forcing the receiver to parse the whole TB to extract these fields. This increases decoding delay (e.g., due to many sequential calls to the memory).

Figure 11:
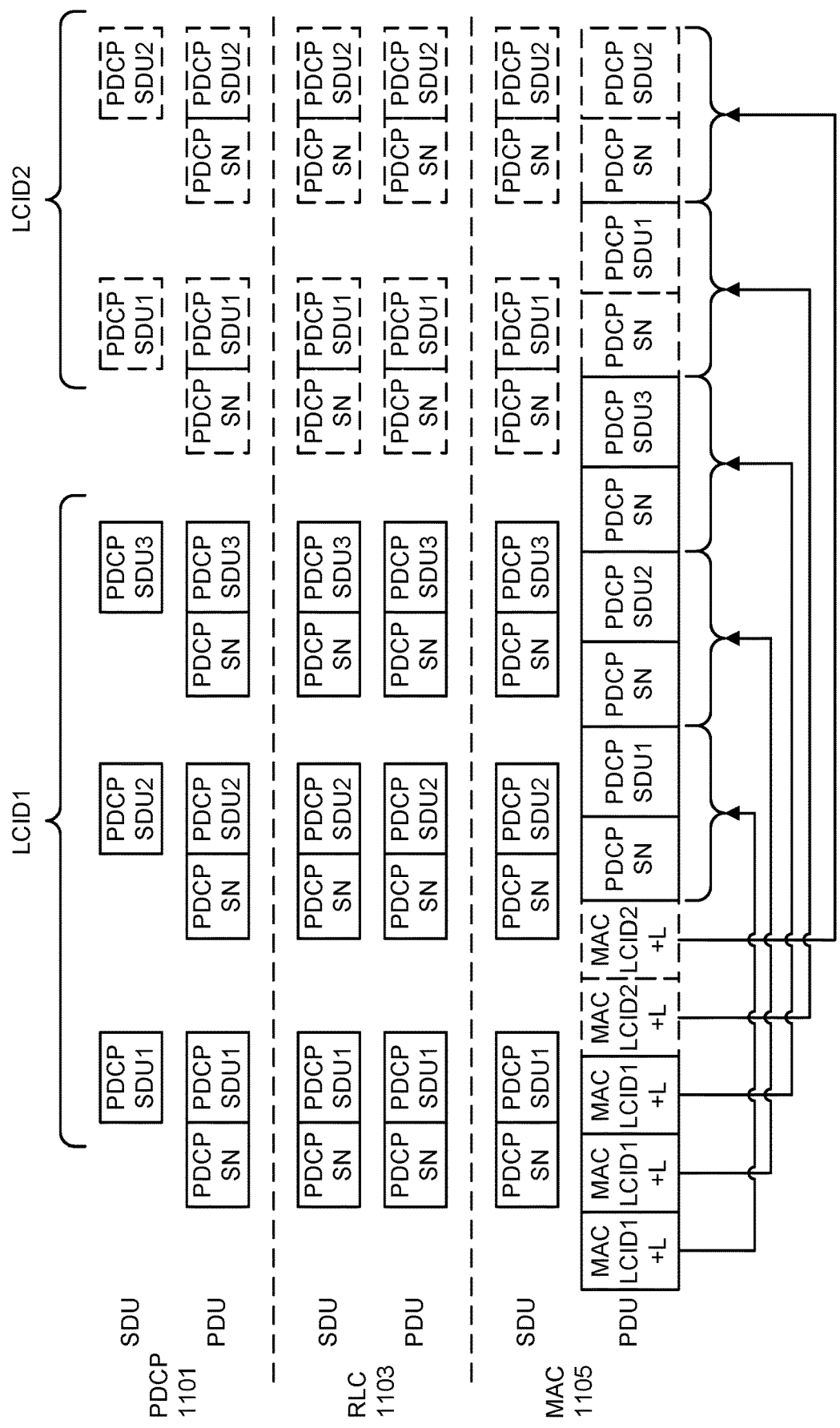
FIG. 11 is a block diagram illustrating a fifth alternative (Alternative 5) for removing concatenation from RLC (MAC CE is placed at the beginning of the MAC frame suitable for DL)

A fifth alternative (Alternative 5) is depicted in FIG. 11. In this alternative the RLC transmitter does not concatenate several RLC SDUs into one RLC PDU. Instead, MAC multiplexes RLC PDUs (which each contain one RLC SDU (or segment)). In this alternative, it is assumed that the PDCP transmitter adds a PDCP SN to the PDCP PDU, but the RLC transmitter does not add an SN to the RLC PDU. In this alternative, the MAC transmitter may perform segmentation for the first and last MAC SDUs included in the MAC PDU, in which case the MAC transmitter adds a Segmentation Info (SI) field for the MAC SDU segment. In order to concatenate (i.e., multiplex) several RLC PDUs into one MAC PDU, the MAC transmitter adds an LCID and L-field for each RLC PDU, and places all MAC subheaders including MAC CE in front of the MAC PDU.

The impact of Alternative 5 is as follows. Like in LTE, creating a PDU is an iterative process since the size of the control information (header) depends, for example, on the number of SDUs in that PDU. This iterative process takes time until the transmission of the MAC PDU may start. Since the beginning of the TB contains the MAC-header, the transmitter cannot construct (and start sending to PHY) the TB prior to knowing the TB-size.

Segmentation may not work in this alternative as it is described now. There is a need to assign sequence numbers after segmentation to allow the transmitter to reassemble the packets in the correct order. But in this alternative there are no SNs assigned after segmentation. In this alternative, there would only be an SN (the PDCP SN) in the first segment, which means that all subsequent segments will not be distinguishable.

ARQ does not work since RLC (where ARQ is performed) does not have any sequence numbers. At a first glance, one could consider that RLC "peeks" into and uses the PDCP SNs, but this does not work for split bearers.

Figure 12:
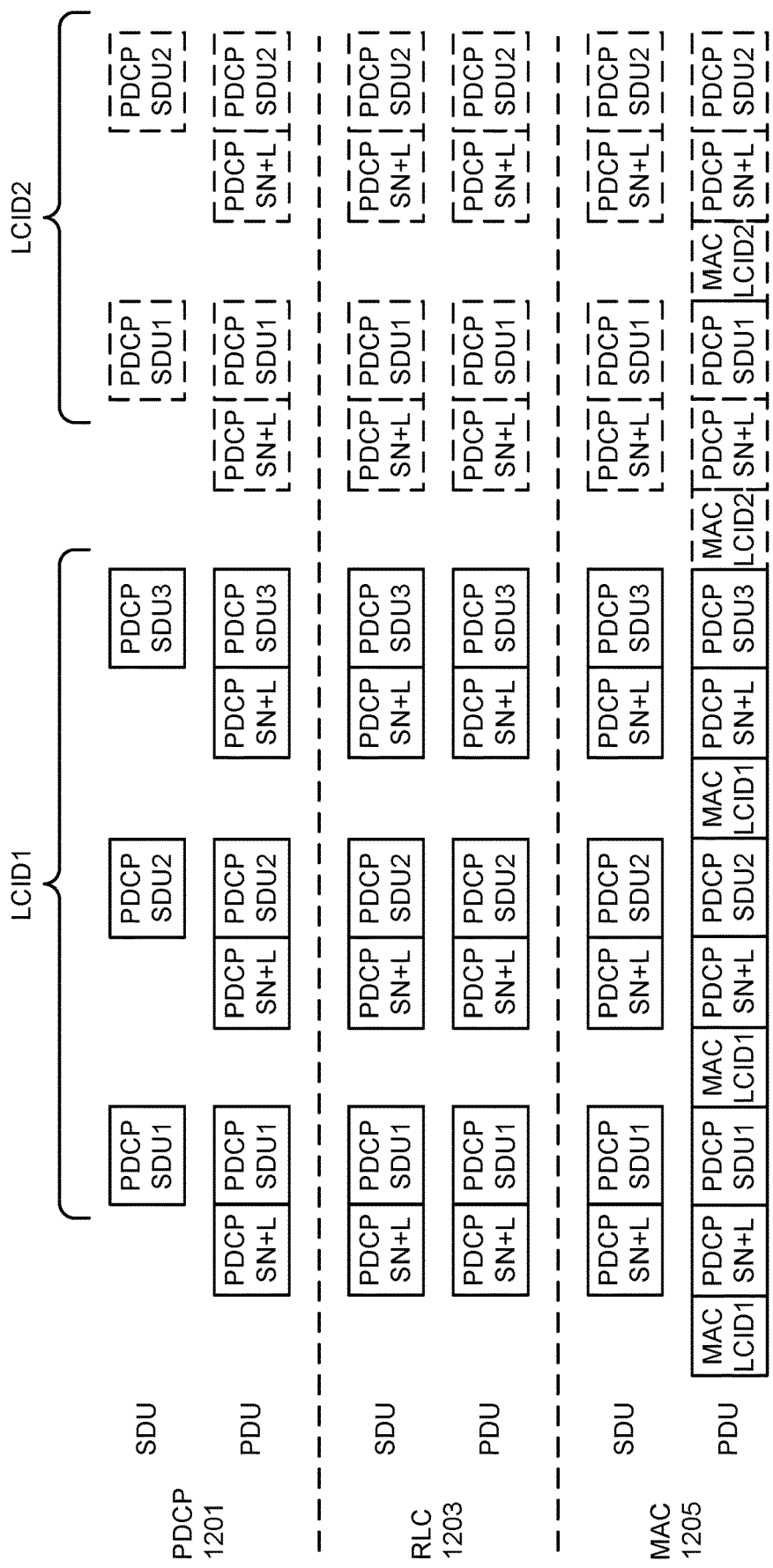
FIG. 12 is a block diagram illustrating a sixth alternative (Alternative 6) for removing concatenation from RLC (MAC CE is placed at the beginning of the MAC frame suitable for DL)

A sixth alternative (Alternative 6) is depicted in FIG. 12. In this alternative, the PDCP transmitter adds a PDCP SN and L-field for each PDCP SDU. To demultiplex, the MAC adds an LCID per MAC SDU. In this alternative, the MAC transmitter may perform segmentation for the first and last MAC SDUs included in the MAC PDU, in which case the MAC transmitter adds a segmentation info (SI) field for the MAC SDU segment.

The impact of Alternative 6 is as follows. If the transport block (TB) provides enough room for an entire MAC SDU, the beginning of the TB does not depend on the outcome of LCP/multiplexing and hence the beginning of the TB can be sent to PHY directly when a grant is decoded, which may speed up a grant to transmission delay. But when an RLC SDU is segmented, the transmitter needs to modify the header information (FI field) of the segmented RLC PDUs. The transmission of an RLC/MAC PDU segment to lower layers may start only after determining the FI. Also, assuming MAC CEs are still placed in the beginning of the MAC PDU, these need to be computed before starting the transmission of the MAC PDU towards L1. This is particularly beneficial for Down-link (DL) processing.

L-fields (MAC LCID fields) are interlaced with the data forcing the receiver to parse the whole TB to extract these fields. This increases decoding delay (e.g., due to many sequential calls to the memory).

Segmentation may not work in this alternative as it is described now. There is a need to assign sequence numbers after segmentation to allow the transmitter to reassemble the packets in the correct order. But in this alternative there are no SNs assigned after segmentation. In this alternative, there would only be an SN (the PDCP SN) in the first segment which means that all subsequent segments will not be distinguishable.

ARQ does not work since RLC (where ARQ is performed) does not have any sequence numbers. At a first glance, one could consider that RLC "peeks" into and uses the PDCP SNs, but this does not work for split bearers.

Figure 13:
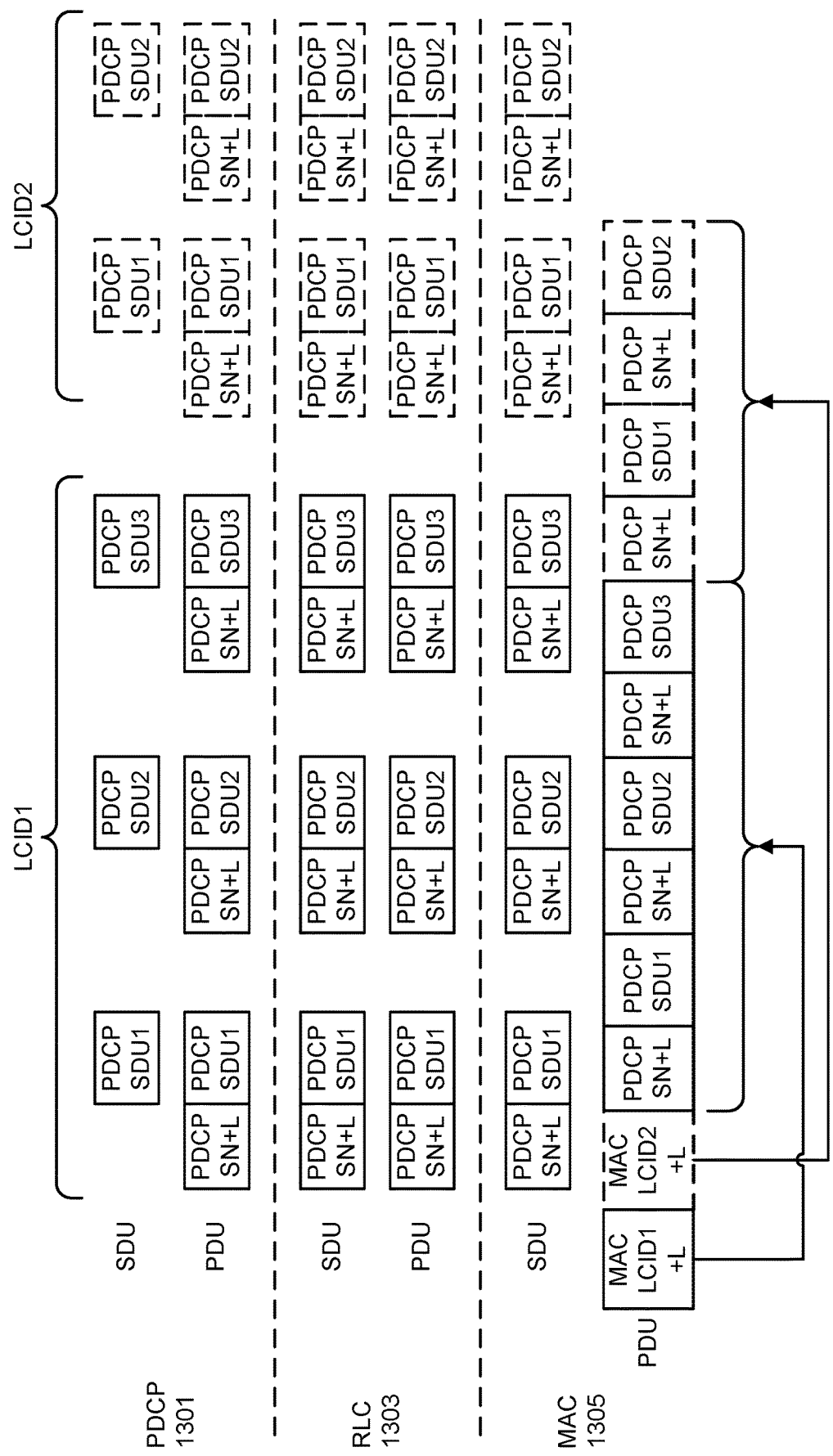
FIG. 13 is a block diagram illustrating a seventh alternative (Alternative 7) for removing concatenation from RLC (MAC CE is placed at the beginning of the MAC frame suitable for DL)

A seventh alternative (Alternative 7) is depicted in FIG. 13. In this alternative, the PDCP PDU header contains not only the PDCP SN but also an L-field per PDCP SDU. The MAC transmitter indicates in the MAC header the LCID and the length-field for the set of PDUs of each RLC-entity. In this alternative, the MAC transmitter may perform segmentation for the first and last MAC SDUs included in the MAC PDU, in which case the MAC transmitter adds an SI field for the MAC SDU segment.

The impact of Alternative 7 is as follows. Like in LTE, creating a PDU is an iterative process since the size of the control information (header) depends, for example, on the number of SDUs in that PDU. This iterative process takes time until the transmission of the MAC PDU may start. Since the beginning of the TB contains the MAC-header, the transmitter cannot construct (and start sending to PHY) the TB prior to knowing the TB-size.

L-fields are interlaced with the data forcing the receiver to parse the whole TB to extract these fields and the receiver needs to parse all these fields before processing of the packets can start. This increases decoding delay (e.g. due to many sequential calls to the memory).

Segmentation may not work in this alternative as it is described now. There is a need to assign sequence numbers after segmentation to allow the transmitter to reassemble the packets in the correct order. But in this alternative there are no SNs assigned after segmentation. In this alternative, there would only be an SN (the PDCP SN) in the first segment which means that all subsequent segments will not be distinguishable.

ARQ does not work since RLC (where ARQ is performed) does not have any sequence numbers. At a first glance, one could consider that RLC "peeks" into and uses the PDCP SNs, but this does not work for split bearers.

The systems and methods described herein introduce a solution to address the complexity of implementation of RLC and MAC in the NR UE and BS. The described systems and methods have two implementation solutions (Asymmetrical) for the two transmitter-sides (TX). One arrangement is for the NR UE TX, which satisfies hardware limitations. The second arrangement is for the NR Base Station (gNB), which enhances the delay performance in the NR gNB and further simplifies the receiver (i.e., UE reception) structure at the UE.

Figure 14:
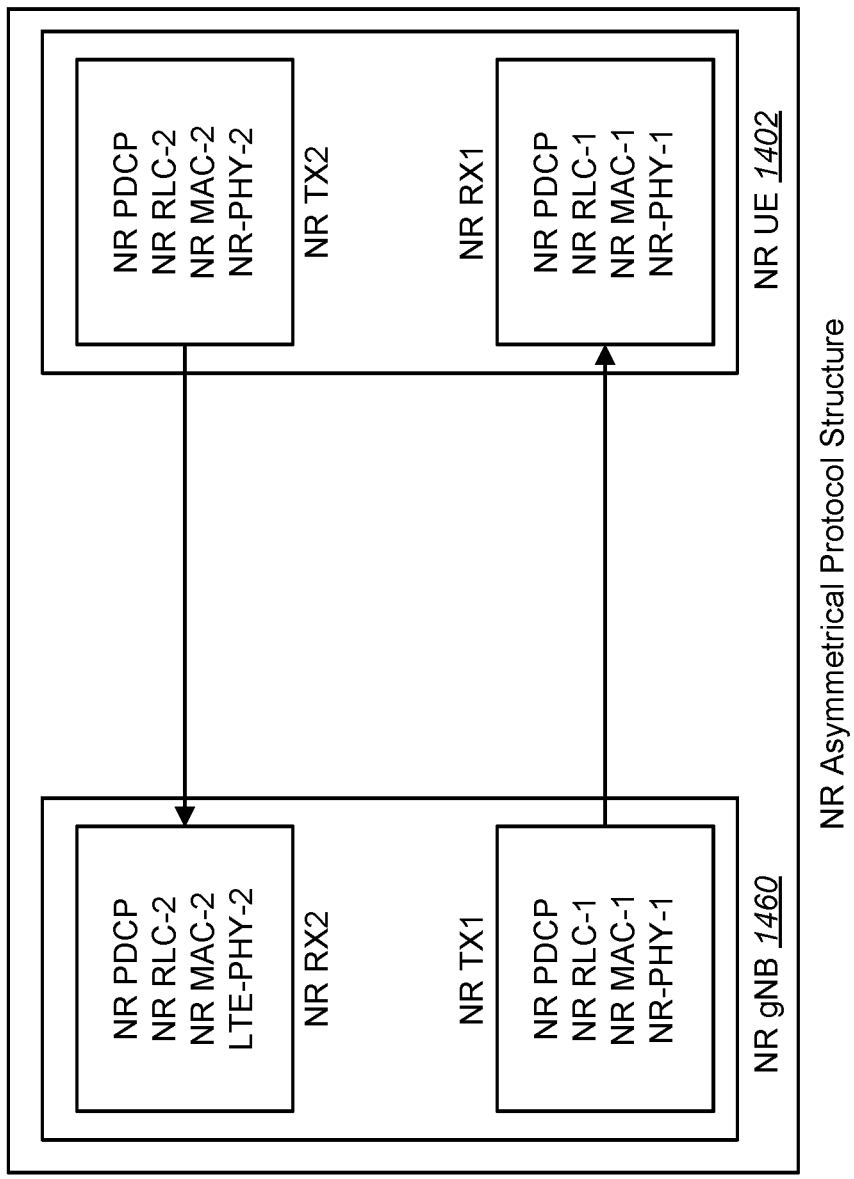
FIG. 14 is a block diagram illustrating an asymmetrical protocol structure for MAC and RLC where the UE constructs and transmits packets using a protocol stack and Packet Formats/Structures that are different from those used by a base station (gNB) in the DL.

An example of an asymmetrical structure for MAC and RLC is depicted in FIG. 14. In this example, the NR gNB TX is associated with RLC-1, MAC-1 and PHY-1, while NR UE TX is associated with RLC-2, MAC-2 and PHY-2

Figure 15:
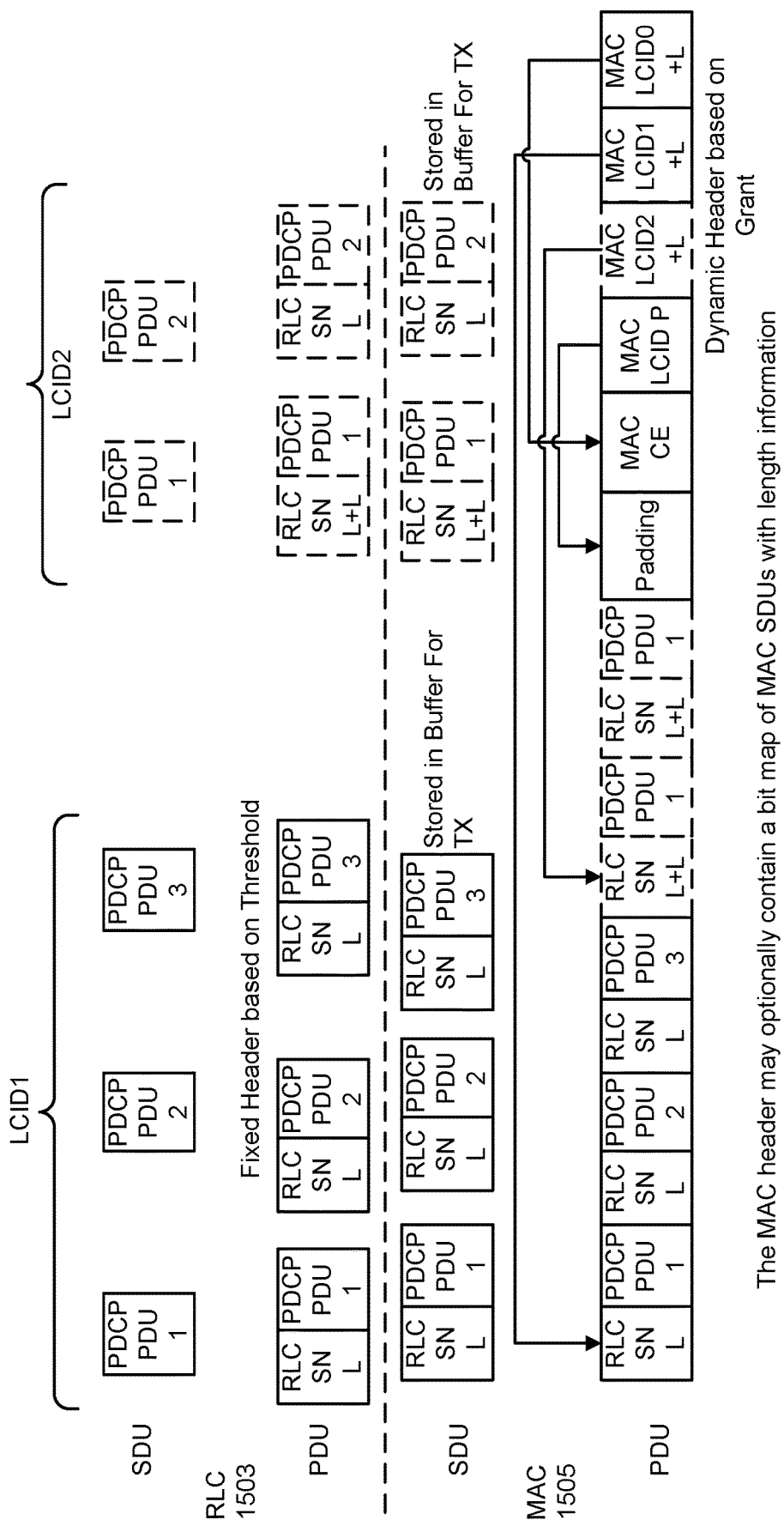
FIG. 15 illustrates an example of new end-based headers for new radio (NR) MAC and RLC, where the MAC header including MAC CE is transmitted at the end of Frame for the UL.

One implementation of the asymmetrical structure for MAC and RLC uses the LTE-based structure of FIG. 3 for NR gNB TX (i.e., RLC-1 and MAC-1). For the NR UE TX (i.e., RLC-2 and MAC-2), different approaches may be used. A non-concatenation structure for the NR UE TX (i.e., RLC-2 and MAC-2 in FIG. 14) may be implemented as shown in FIG. 7 or end-based headers concatenation may be implemented as shown in FIG. 6 or FIG. 15.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH Hybrid ARQ (HARQ)-acknowledgement (ACK) information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB new radio (NR) module 194. The eNB NR module 194 may perform concatenation operations as described above.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
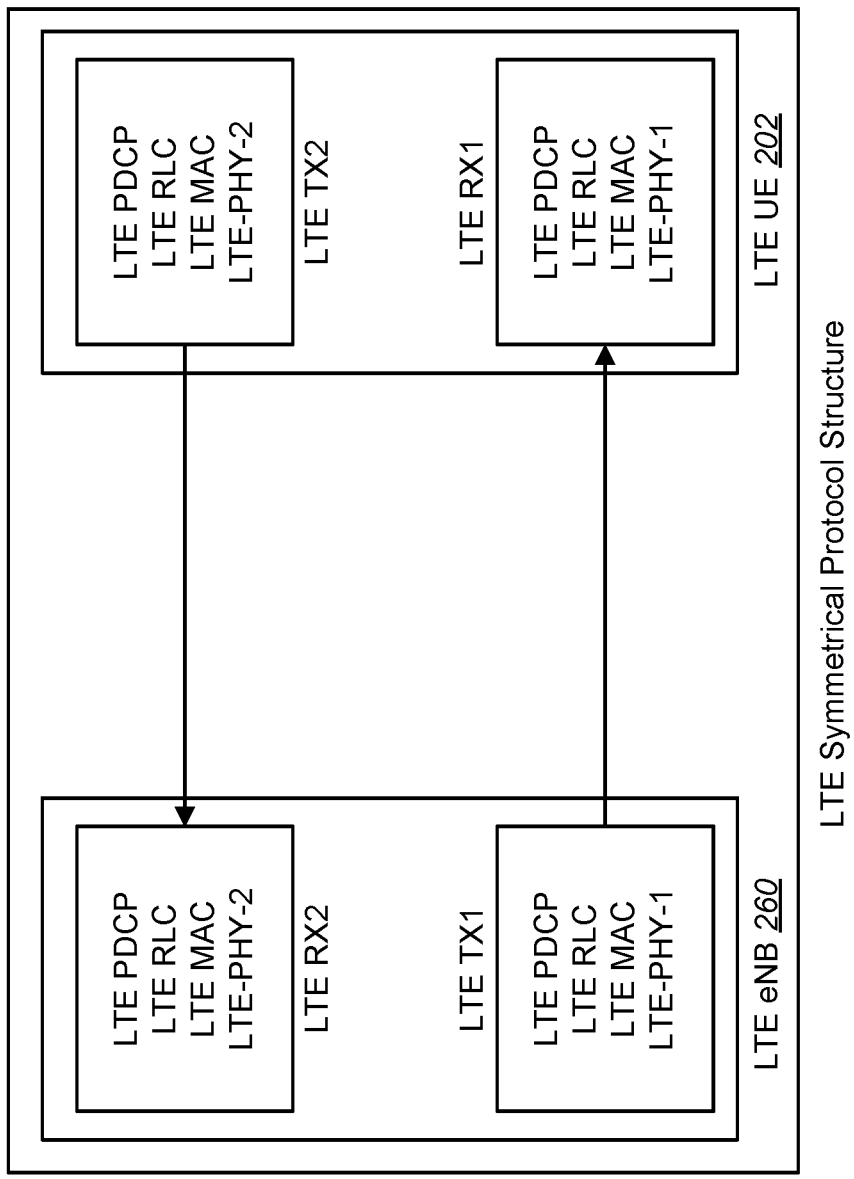
FIG. 2 is a block diagram illustrating a Long Term Evolution (LTE) eNB symmetrical protocol structure.

FIG. 2 is a block diagram illustrating an LTE eNB symmetrical protocol structure. A first LTE Transmission (TX1) by an LTE eNB 260 has an LTE PDCP, an LTE RLC, an LTE MAC and a first LTE physical layer (PHY-1). A corresponding LTE reception (LTE RX1) by an LTE UE 202 has an LTE PDCP, an LTE RLC, an LTE MAC and the first LTE physical layer (PHY-1).

A second LTE Transmission (TX2) by the LTE UE 202 has an LTE PDCP, an LTE RLC, an LTE MAC and a second LTE physical layer (PHY-2). A corresponding LTE reception (LTE RX2) by an LTE eNB 260 has an LTE PDCP, an LTE RLC, an LTE MAC and the second LTE physical layer (PHY-2).

FIG. 3 is a block diagram illustrating a Radio Link Control (RLC) and Medium Access Control (MAC) structure, where the MAC header including MAC control element (CE) is transmitted at the front of a frame for the DL. One implementation of the asymmetrical structure for MAC and RLC (described in FIG. 14) may use the LTE-based structure of FIG. 3 for NR gNB TX (i.e., RLC-1 and MAC-1).

FIG. 4 is a block diagram illustrating a protocol structure for downlink (DL). Service Access Points (SAP) for peer-to-peer communication are marked with circles at the interface between sublayers. The SAP between the physical layer and the MAC sublayer 405 provides the transport channels 411. The SAPs between the MAC sublayer 405 and the RLC sublayer 403 provide the logical channels 409.

The multiplexing of several logical channels 409 (i.e., radio bearers 407) on the same transport channel 411 (i.e., transport block) is performed by the MAC sublayer 405. In both uplink and downlink, when neither carrier aggregation (CA) nor dual connectivity (DC) are configured, only one transport block is generated per Transmission Time Interval (TTI) in the absence of spatial multiplexing. In Sidelink, only one transport block is generated per TTI.

The main services and functions of the MAC sublayer 405 may include: Mapping between logical channels and transport channels; Multiplexing/demultiplexing of MAC SDUs belonging to one or different logical channels 409 into/from transport blocks (TB) delivered to/from the physical layer on transport channels 411; Scheduling information reporting; Error correction through HARQ; Priority handling between logical channels of one UE; Priority handling between UEs by means of dynamic scheduling; Multimedia Broadcast Multicast Services (MBMS) service identification; Transport format selection; and/or Padding.

The sidelink specific services and functions of the MAC sublayer 405 may include: Radio resource selection; and/or Packet filtering for sidelink communication.

Different kinds of data transfer services as offered by MAC 405. Each logical channel type is defined by what type of information is transferred. A general classification of logical channels 409 is into two groups: Control Channels (for the transfer of control plane information); and Traffic Channels (for the transfer of user plane information).

Control channels may be used for transfer of control plane information only. The control channels that may be offered by MAC 405 include one or more of the following:

Broadcast Control Channel (BCCH) is a downlink channel for broadcasting system control information.

Bandwidth Reduced Broadcast Control Channel (BR-BCCH) is a downlink channel for broadcasting system control information.

Paging Control Channel (PCCH) is a downlink channel that transfers paging information and system information change notifications. This channel is used for paging when the network does not know the location cell of the UE 102.

Common Control Channel (CCCH) is a channel for transmitting control information between UEs 102 and network. This channel is used for UEs 102 having no Radio Resource Control (RRC) connection with the network.

Multicast Control Channel (MCCH) is a point-to-multipoint downlink channel used for transmitting MBMS control information from the network to the UE 102, for one or several Multicast Traffic Channels (MTCHs). This channel is only used by UEs 102 that receive or are interested to receive MBMS.

Single-Cell Multicast Control Channel (SC-MCCH) is a point-to-multipoint downlink channel used for transmitting MBMS control information from the network to the UE 102, for one or several Single-Cell Multicast Traffic Channels (SC-MTCHs). This channel is only used by UEs 102 that receive or are interested to receive MBMS using Single-Cell Point-to-Multipoint (SC-PTM).

Dedicated Control Channel (DCCH) is a point-to-point bi-directional channel that transmits dedicated control information between a UE 102 and the network. This channel may be used by UEs 102 having an RRC connection.

Sidelink Broadcast Control Channel (SBCCH) is a sidelink channel for broadcasting sidelink system information from one UE 102 to other UE(s) 102.

Traffic channels are used for the transfer of user plane information only. The traffic channels offered by MAC 405 may include the following:

Dedicated Traffic Channel (DTCH) is a point-to-point channel, dedicated to one UE 102, for the transfer of user information. A DTCH can exist in both uplink and downlink. DTCH is not supported for a NB-IoT UE that only using Control Plane CIoT EPS optimizations.

Multicast Traffic Channel (MTCH) is a point-to-multipoint downlink channel for transmitting traffic data from the network to the UE 102. This channel is only used by UEs 102 that receive MBMS.

Single-Cell Multicast Traffic Channel (SC-MTCH) is a point-to-multipoint downlink channel for transmitting traffic data from the network to the UE 102 using SC-PTM transmission. This channel is only used by UEs that receive MBMS using SC-PTM.

Sidelink Traffic Channel (STCH) is a point-to-multipoint channel, for transfer of user information from one UE 102 to other UE(s) 102. This channel is used only by sidelink communication capable UEs 102. Point-to-point communication between two sidelink communication capable UEs 102 is also realized with an STCH.

The main services and functions of the RLC sublayer 403 may include the one or more of the following: Transfer of upper layer PDUs; Error Correction through ARQ; Concatenation, segmentation and reassembly of RLC SDUs; Re-segmentation of RLC data PDUs; Reordering of RLC data PDUs; Duplicate detection; Protocol error detection; RLC SDU discard; and/or RLC re-establishment.

The PDU sequence number carried by the RLC header may be independent of the SDU sequence number (i.e., PDCP sequence number).

The main services and functions of the PDCP sublayer 401 for the user plane may include one or more of the following: Header compression and decompression: Robust Header Compression (ROHC) only; Transfer of user data; In-sequence delivery of upper layer PDUs at PDCP re-establishment procedure for RLC AM; For split bearers in DC (only support for RLC AM): PDCP PDU routing for transmission and PDCP PDU reordering for reception; Duplicate detection of lower layer SDUs at PDCP re-establishment procedure for RLC AM; Retransmission of PDCP SDUs at handover and, for split bearers in DC, of PDCP PDUs at PDCP data-recovery procedure, for RLC AM; Ciphering and deciphering; Timer-based SDU discard in uplink.

FIG. 5 is a block diagram illustrating a protocol structure for uplink (UL). Service Access Points (SAP) for peer-to-peer communication are marked with circles at the interface between sublayers. The SAP between the physical layer and the MAC sublayer 505 provides the transport channels. The SAPs between the MAC sublayer and the RLC sublayer 503 provide the logical channels 509. The multiplexing of several logical channels 509 (i.e., radio bearers 507) on the same transport channel 511 (i.e., transport block) is performed by the MAC sublayer 505.

The PDCP 501 is the top sublayer of the LTE user plane layer 2 protocol stack, above the Radio Link Control (RLC) sublayer 503. The PDCP layer 501 processes Radio Resource Control (RRC) messages in the control plane and Internet Protocol (IP) packets in the user plane. Depending on the radio bearer 507, the main functions of the PDCP layer may include header compression, security (integrity protection and ciphering), and support for reordering and retransmission during handover.

FIG. 6 is a block diagram illustrating an approach to concatenation where the MAC header including MAC CE is transmitted at the end of Frame for the UL. FIG. 6 illustrates an implementation of an RLC and MAC structure. An RLC 603 is illustrated with corresponding SDUs and PDUs. A MAC 605 is also illustrated with corresponding SDUs and PDUs. In this approach, concatenation is like in LTE. However, dynamic parts (e.g., headers and MAC CEs) are in the end of the TB. RLC headers may be appended after the data of that RLC PDU. This particular implementation would be beneficial in the Up-link (UL), where the MAC CE is transmitted at the end of the frame.

The concatenation structure of FIG. 6 may be used for the asymmetrical structure for MAC and RLC as depicted in FIG. 14. An end-based headers concatenation structure may be implemented for the NR UE TX (i.e., RLC-2 and MAC-2 in FIG. 14).

Figure 7:
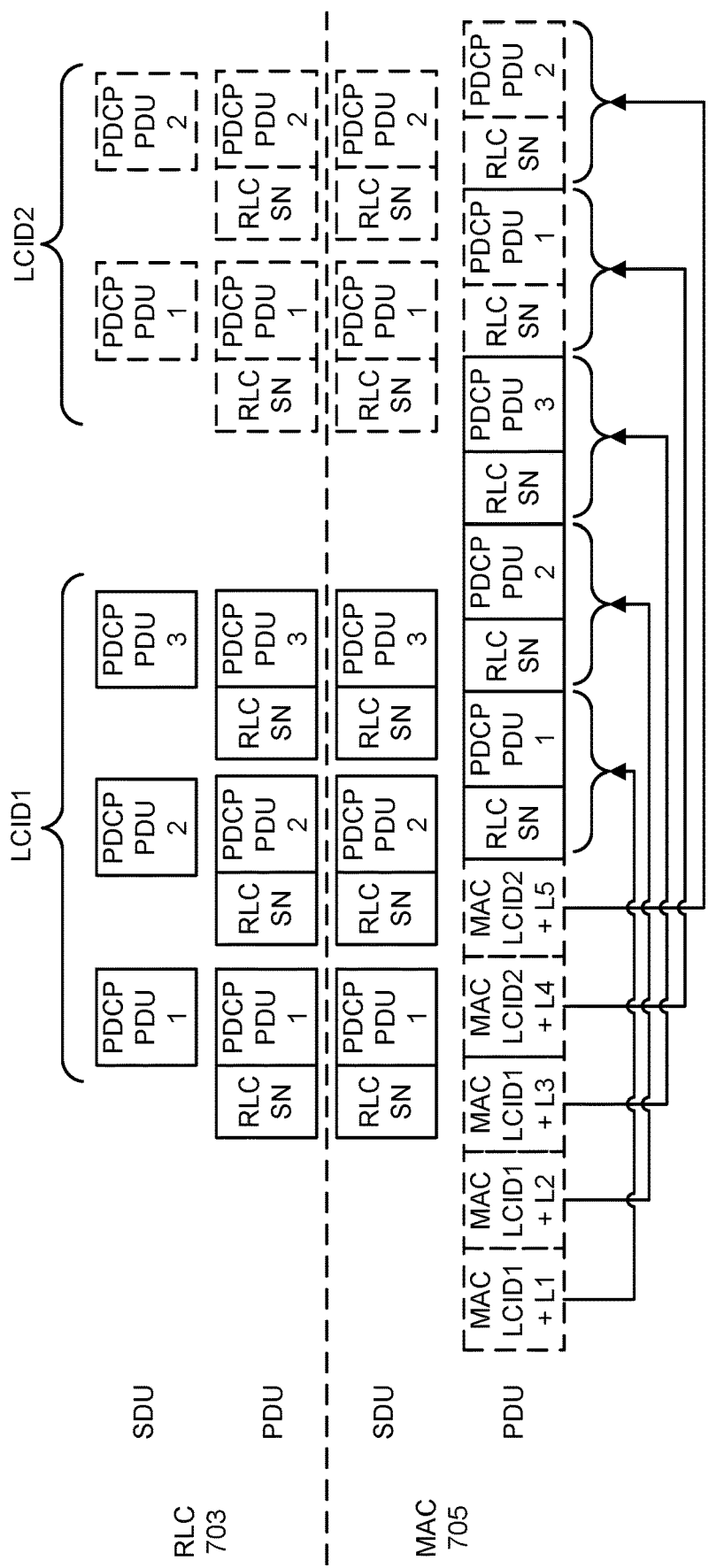
FIG. 7 is a block diagram illustrating a first alternative (Alternative 1) for removing concatenation from RLC, (MAC CE is placed at the beginning of the MAC frame suitable for DL)

FIG. 7 is a block diagram illustrating a first alternative (Alternative 1) for removing concatenation from RLC. In this alternative, the MAC CE is placed at the beginning of the MAC frame for DL. FIG. 7 illustrates an implementation of an RLC and MAC structure. An RLC 703 is illustrated with corresponding SDUs and PDUs. A MAC 705 is also illustrated with corresponding SDUs and PDUs. The non-concatenation structure of FIG. 7 may be used for the asymmetrical structure for MAC and RLC as depicted in FIG. 14. A non-concatenation structure may be implemented for the NR UE TX (i.e., RLC-2 and MAC-2 in FIG. 14).

FIG. 8 illustrates on implementation of an RLC and MAC structure. In this alternative, the MAC CE is placed at the beginning of the MAC frame for DL. An RLC 803 is illustrated with corresponding SDUs and PDUs. A MAC 805 is also illustrated with corresponding SDUs and PDUs.

FIG. 9 is a block diagram illustrating a third alternative (Alternative 3) for removing concatenation from RLC. In this alternative, the MAC CE is placed at the beginning of the MAC frame for DL. FIG. 9 illustrates an implementation of an RLC and MAC structure. An RLC 903 is illustrated with corresponding SDUs and PDUs. A MAC 905 is also illustrated with corresponding SDUs and PDUs.

FIG. 10 is a block diagram illustrating a fourth alternative (Alternative 4) for removing concatenation from RLC. In this alternative, the MAC CE is placed at the beginning of the MAC frame for DL. FIG. 10 illustrates an implementation of a PDCP, RLC and MAC structure. A PDCP 1001 is illustrated with corresponding SDUs and PDUs. An RLC 1003 is illustrated with corresponding SDUs and PDUs. A MAC 1005 is also illustrated with corresponding SDUs and PDUs.

FIG. 11 is a block diagram illustrating a fifth alternative (Alternative 5) for removing concatenation from RLC. In this alternative, the MAC CE is placed at the beginning of the MAC frame for DL. FIG. 11 illustrates an implementation of a PDCP, RLC and MAC structure. A PDCP 1101 is illustrated with corresponding SDUs and PDUs. An RLC 1103 is illustrated with corresponding SDUs and PDUs. A MAC 1105 is also illustrated with corresponding SDUs and PDUs.

FIG. 12 is a block diagram illustrating a sixth alternative (Alternative 6) for removing concatenation from RLC. In this alternative, the MAC CE is placed at the beginning of the MAC frame for DL. FIG. 12 illustrates an implementation of a PDCP, RLC and MAC structure. A PDCP 1201 is illustrated with corresponding SDUs and PDUs. An RLC 1203 is illustrated with corresponding SDUs and PDUs. A MAC 1205 is also illustrated with corresponding SDUs and PDUs.

FIG. 13 is a block diagram illustrating a seventh alternative (Alternative 7) for removing concatenation from RLC. In this alternative, the MAC CE is placed at the beginning of the MAC frame for DL. FIG. 13 illustrates an implementation of a PDCP, RLC and MAC structure. A PDCP 1301 is illustrated with corresponding SDUs and PDUs. An RLC 1303 is illustrated with corresponding SDUs and PDUs. A MAC 1305 is also illustrated with corresponding SDUs and PDUs.

FIG. 14 is a block diagram illustrating an asymmetrical protocol structure for MAC and RLC where the UE constructs and transmits (i.e., UL NR TX2) packets using a protocol stack (i.e., PHY/MAC/RLC/PDCP) and packet formats and/or structures that are different from those used by the base station (gNB) in the DL (NR TX1). Among the differences are the location of the MAC header with MAC CE in both directions (at the end of MAC frame for the UL and is placed at the beginning of the MAC frame for DL). In this example, transmission (TX) by the NR gNB 1460 (NR TX1) and corresponding reception by NR UE 1402 (NR RX1) is associated with RLC-1, MAC-1 and PHY-1. The TX by the NR UE 1402 (NR TX2) and corresponding reception by the NR gNB 1460 (NR RX2) is associated with RLC-2, MAC-2 and PHY-2.

One implementation of the asymmetrical structure for MAC AND RLC uses the LTE-based structure of FIG. 3 for NR gNB TX (i.e., RLC-1 and MAC-1). For the NR UE TX (i.e., RLC-2 and MAC-2), different approaches may be used. A non-concatenation structure for the NR UE TX (i.e., RLC-2 and MAC-2 in FIG. 14) may be implemented as shown in FIG. 7 or end-based headers concatenation may be implemented as shown in FIG. 6 or FIG. 15.

Figure 16:
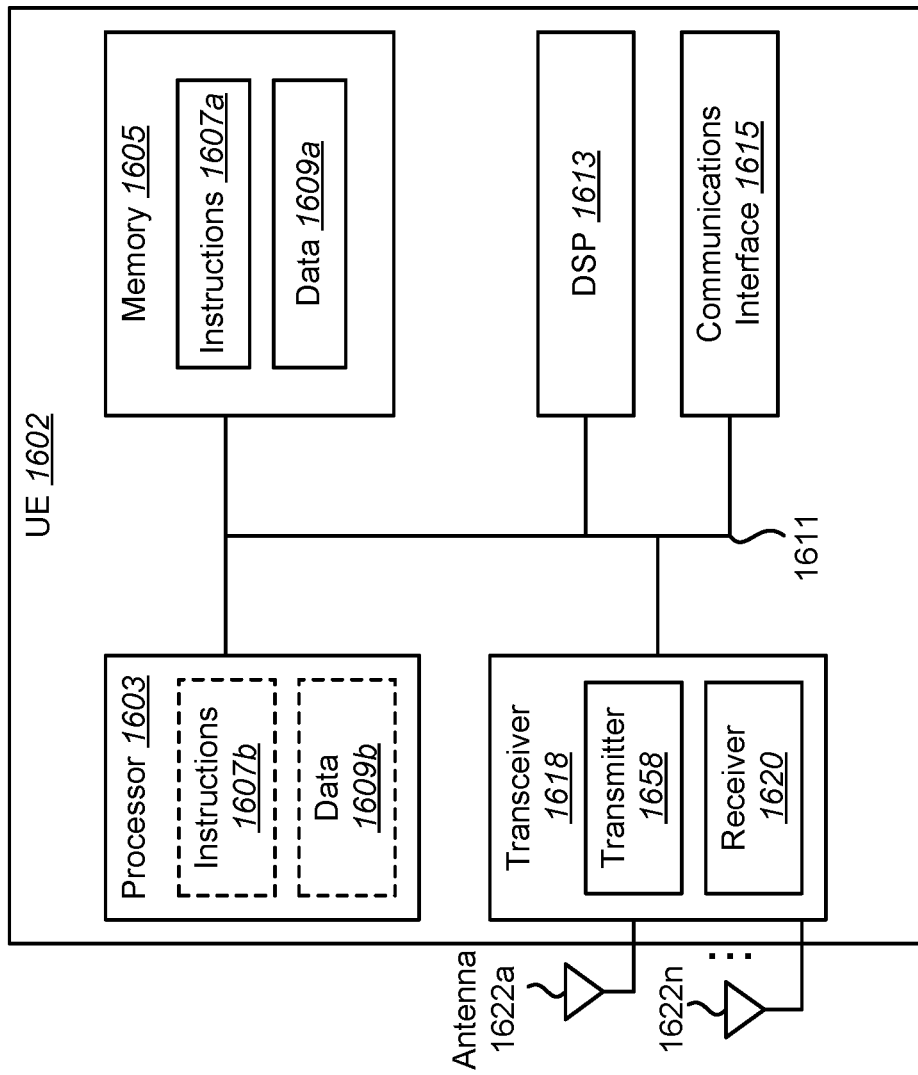
FIG. 16 illustrates various components that may be utilized in a UE, where the MAC header including MAC CE is transmitted at the end of Frame for the UL.

FIG. 15 illustrates an example of new end-based headers for new radio (NR) MAC 1505 and RLC 1503. The MAC header including MAC CE is transmitted at the end of a frame for the UL. An RLC 1503 is illustrated with corresponding SDUs and PDUs. A MAC 1505 is also illustrated with corresponding SDUs and PDUs. In particular, FIG. 16 shows a fixed header RLC with no concatenation and a trailing MAC header. The MAC header may optionally contain a bit map of MAC SDUs with length information. There may also be a dynamic header based on grant.

The concatenation structure of FIG. 15 may be used for the asymmetrical structure for MAC 1505 and RLC 1503 as depicted in FIG. 14. An end-based headers concatenation structure may be implemented for the NR UE TX (i.e., RLC-2 and MAC-2 in FIG. 14).

FIG. 16 illustrates various components that may be utilized in a UE 1602. The MAC header including MAC CE may be transmitted at the end of a frame for the UL. The UE 1602 described in connection with FIG. 16 may be implemented in accordance with the UE 102 described in connection with FIG. 1. The UE 1602 includes a processor 1603 that controls operation of the UE 1602. The processor 1603 may also be referred to as a central processing unit (CPU). Memory 1605, which may include read-only memory (ROM), random access memory (RAM), a combination of the two or any type of device that may store information, provides instructions 1607*a* and data 1609*a* to the processor 1603. A portion of the memory 1605 may also include non-volatile random access memory (NVRAM). Instructions 1607*b* and data 1609*b* may also reside in the processor 1603. Instructions 1607*b* and/or data 1609*b* loaded into the processor 1603 may also include instructions 1607*a* and/or data 1609*a* from memory 1605 that were loaded for execution or processing by the processor 1603. The instructions 1607*b* may be executed by the processor 1603 to implement one or more of the methods described above.

The UE 1602 may also include a housing that contains one or more transmitters 1658 and one or more receivers 1620 to allow transmission and reception of data. The transmitter(s) 1658 and receiver(s) 1620 may be combined into one or more transceivers 1618. One or more antennas 1622*a*-*n* are attached to the housing and electrically coupled to the transceiver 1618.

The various components of the UE 1602 are coupled together by a bus system 1611, which may include a power bus, a control signal bus and a status signal bus, in addition to a data bus. However, for the sake of clarity, the various buses are illustrated in FIG. 16 as the bus system 1611. The UE 1602 may also include a digital signal processor (DSP)

1613 for use in processing signals. The UE 1602 may also include a communications interface 1615 that provides user access to the functions of the UE 1602. The UE 1602 illustrated in FIG. 16 is a functional block diagram rather than a listing of specific components.

Figure 17:
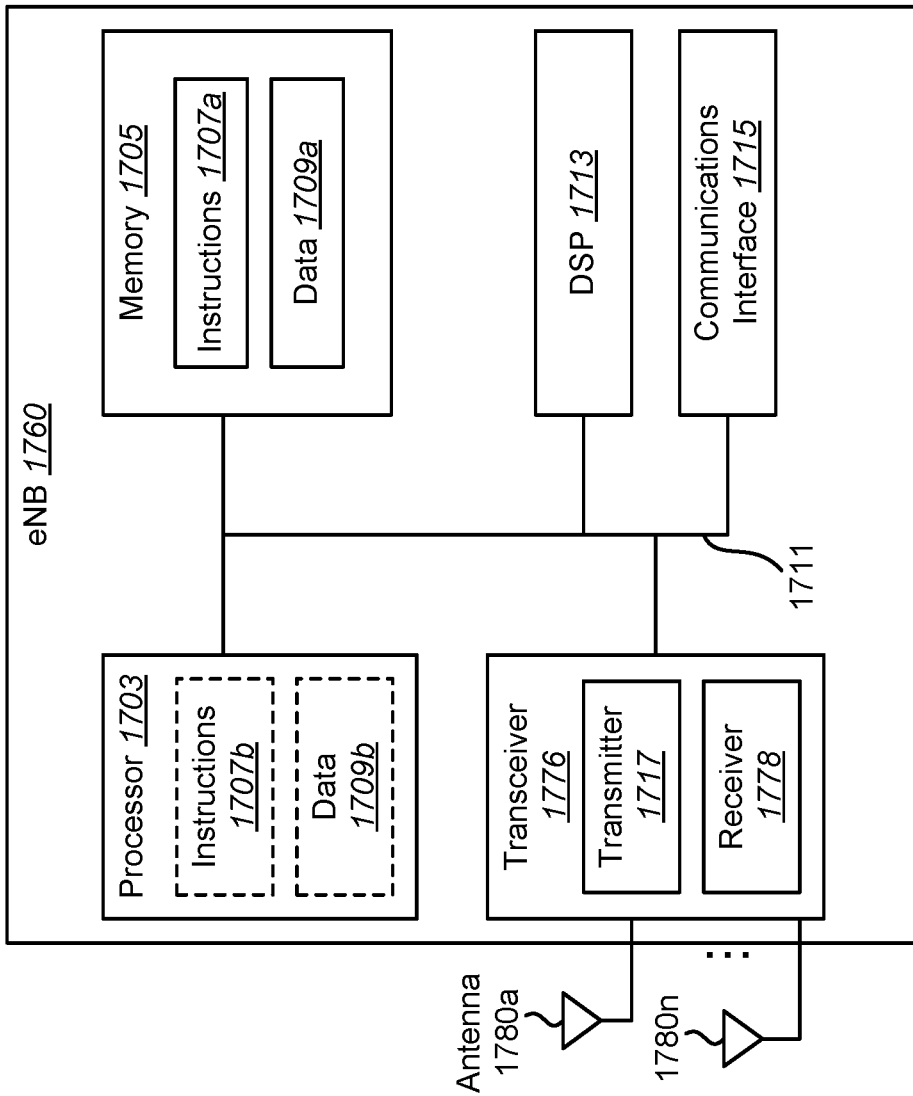
FIG. 17 illustrates various components that may be utilized in an eNB.

FIG. 17 illustrates various components that may be utilized in an eNB 1760. The eNB 1760 described in connection with FIG. 17 may be implemented in accordance with the eNB 170 described in connection with FIG. 1. The eNB 1760 includes a processor 1703 that controls operation of the eNB 1760. The processor 1703 may also be referred to as a central processing unit (CPU). Memory 1705, which may include read-only memory (ROM), random access memory (RAM), a combination of the two or any type of device that may store information, provides instructions 1707a and data 1709a to the processor 1703. A portion of the memory 1705 may also include non-volatile random access memory (NVRAM). Instructions 1707b and data 1709b may also reside in the processor 1703. Instructions 1707b and/or data 1709b loaded into the processor 1703 may also include instructions 1707a and/or data 1709a from memory 1705 that were loaded for execution or processing by the processor 1703. The instructions 1707b may be executed by the processor 1703 to implement one or more of the methods described above.

The eNB 1760 may also include a housing that contains one or more transmitters 1717 and one or more receivers 1778 to allow transmission and reception of data. The transmitter(s) 1717 and receiver(s) 1778 may be combined into one or more transceivers 1776. One or more antennas 1780a-n are attached to the housing and electrically coupled to the transceiver 1776.

The various components of the eNB 1760 are coupled together by a bus system 1711, which may include a power bus, a control signal bus and a status signal bus, in addition to a data bus. However, for the sake of clarity, the various buses are illustrated in FIG. 17 as the bus system 1711. The eNB 1760 may also include a digital signal processor (DSP) 1713 for use in processing signals. The eNB 1760 may also include a communications interface 1715 that provides user access to the functions of the eNB 1760. The eNB 1760 illustrated in FIG. 17 is a functional block diagram rather than a listing of specific components.

Figure 18:
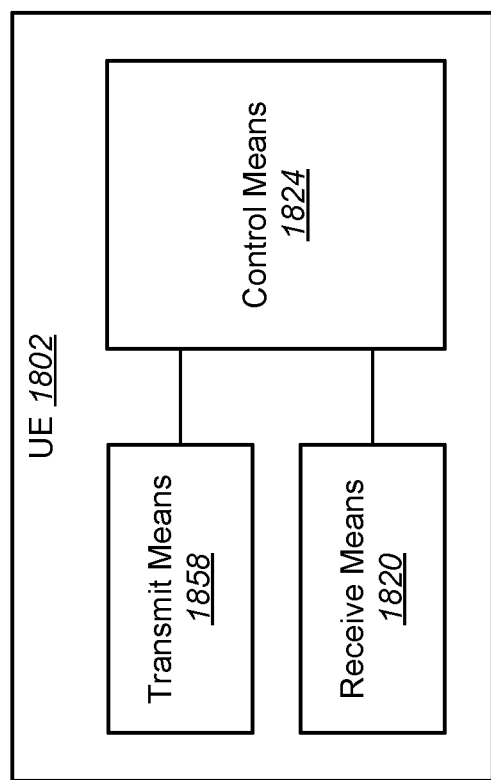
FIG. 18 is a block diagram illustrating one implementation of a UE in which systems and methods for an ASYMMETRICAL up-link/down-link protocol stack and frame structure may be implemented.

FIG. 18 is a block diagram illustrating one implementation of a UE 1802 in which systems and methods for an ASYMMETRICAL up-link/down-link protocol stack and frame structure may be implemented. The UE 1802 includes transmit means 1858, receive means 1820 and control means 1824. The transmit means 1858, receive means 1820 and control means 1824 may be configured to perform one or more of the functions described in connection with FIG. 1 above. FIG. 16 above illustrates one example of a concrete apparatus structure of FIG. 18. Other various structures may be implemented to realize one or more of the functions of FIG. 1. For example, a DSP may be realized by software.

Figure 19:
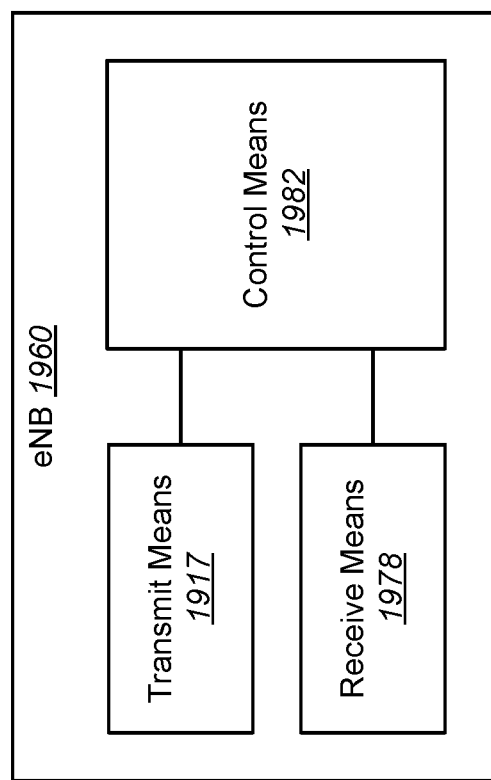
FIG. 19 is a block diagram illustrating one implementation of an eNB in which systems and methods for an ASYMMETRICAL up-link/down-link protocol stack and frame structure may be implemented.

FIG. 19 is a block diagram illustrating one implementation of an eNB 1960 in which systems and methods for an ASYMMETRICAL up-link/down-link protocol stack and frame structure may be implemented. The eNB 1960 includes transmit means 1917, receive means 1978 and control means 1982. The transmit means 1917, receive means 1978 and control means 1982 may be configured to perform one or more of the functions described in connection with FIG. 1 above. FIG. 17 above illustrates one example of a concrete apparatus structure of FIG. 19. Other various structures may be implemented to realize one or more of the functions of FIG. 1. For example, a DSP may be realized by software.

Figure 20:
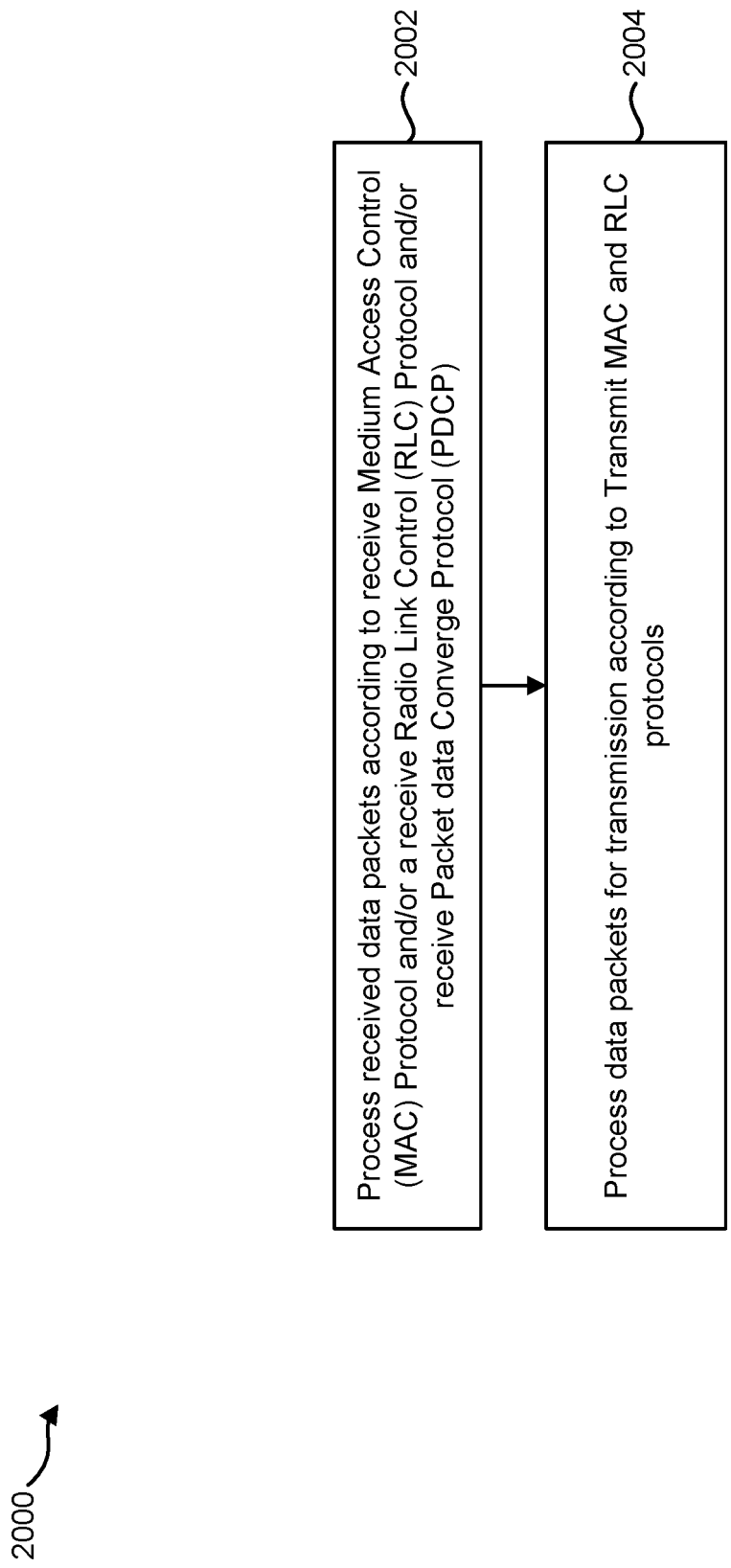
FIG. 20 is a flow diagram illustrating a method by a UE.

FIG. 20 is a flow diagram illustrating a method 2000 by a UE 102. The UE 102 may be a 5G NR UE configured for transmitting and receiving NR User Plane data traffic.

The UE 102 may process 2002 received data packets according to receive Medium Access Control (MAC) Protocol and/or a Received Radio Link Control (RLC) Protocol and/or receive Packet data Converge Protocol (PDCP).

The UE 102 may process 2004 data packets for transmission according to Transmit MAC and RLC protocols. The Transmit MAC and/or RLC frame structure and/or PDCP frame structure is different in formats than those from a receive MAC and/or RLC frame structure and/or PDCP frame structure.

The RLC Protocol may be based on LTE RLC while Transmit Radio Link Control (RLC) Protocol is not based on LTE RLC. Alternatively, the Receive RLC protocol may not be based on LTE while Transmit RLC Protocol is based on LTE RLC.

The Receive MAC Protocol may be based on LTE MAC while Transmit MAC Protocol is not LTE based. Alternatively, the Receive MAC Protocol may not be based on LTE MAC while Transmit MAC Protocol is LTE based.

The transmit MAC processing protocol and/or transmit MAC frame structure in the UE may be different from that in a transmit MAC processing protocol and/or transmit frame structure in a base station (e.g., gNB). The transmit RLC processing protocol and/or RLC transmit frame structure in the UE may be different from that in a transmit RLC processing protocol and/or transmit frame structure in a base station (e.g., gNB). The transmit PDCP protocol in the UE may be different from that in a transmit PDCP protocol in a base station.

The receive MAC processing protocol and received frame formats in the UE may be different from that in a receive MAC processing protocol and received frame formats in a base station (e.g., gNB). The Receive RLC protocol in the UE may be different from that in the Receive RLC protocol in the Base station (e.g., gNB). The receive PDCP protocol in the UE may be different from that in a receive PDCP protocol in a base station.

The Transmitting RLC Protocol in the UE may perform concatenation while the Transmitting RLC protocol in the Base station (e.g., gNB) does not perform concatenation. The Transmitting RLC Protocol at the Base station (e.g., gNB) may have a fixed size RLC Sequence number and length field. The Transmitting RLC Protocol at the Base station (e.g., gNB) may not wait for input from the Transmitting MAC protocol. The Transmitting RLC Protocol at the Base station (e.g., gNB) may be independent of the physical layer (PHY) Transport Block size.

The Transmitting RLC Protocol in the UE may not perform concatenation while the Transmitting RLC protocol in the Base station (e.g., gNB) performs concatenation. The Transmitting RLC Protocol at the UE may have a fixed size RLC Sequence number and length field. The Transmitting RLC Protocol at the UE may not wait for input from the Transmitting MAC protocol. The Transmitting RLC Protocol at the UE may be independent of the physical layer (PHY) Transport Block size.

The Transmitting RLC Protocol in the UE may perform concatenation in a different structure than that performed at the Transmitting RLC protocol in the Base station (e.g., gNB).

The Transmitting MAC Protocol in the UE may construct MAC subPDU(s) including headers and MAC CE at the beginning of the MAC frame while the Transmitting MAC protocol in the Base station (e.g., gNB) constructs MAC subPDU(s) including headers and MAC CE at the back end of the MAC frame.

The Transmitting MAC Protocol in the UE may construct MAC subPDU(s) including headers and MAC CE at the back end of the MAC frame while the Transmitting MAC protocol in the Base station (e.g., gNB) constructs MAC subPDU(s) including headers and MAC CE at the beginning of the MAC frame.

Figure 21:
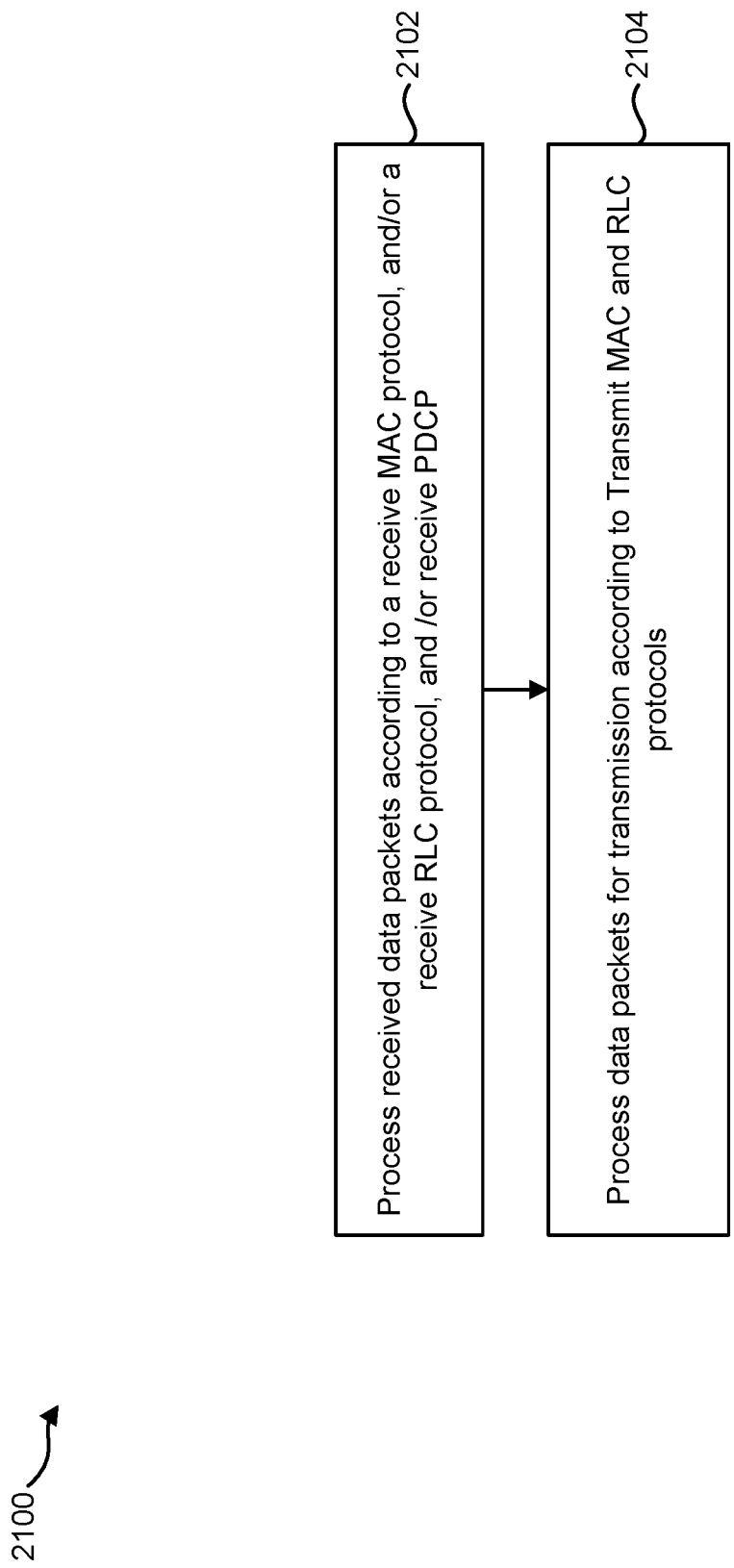
FIG. 21 is a flow diagram illustrating a method by an eNB.

FIG. 21 is a flow diagram illustrating a method 2100 by an eNB 160. The eNB 160 may be a 5G NR Base Station (gNB) configured for transmitting and receiving NR User Plane data traffic.

The eNB 160 may process 2102 received data packets according to a receive Medium Access Control (MAC) protocol, and/or a receive Radio Link Control (RLC) protocol, and/or receive Packet data Converge Protocol (PDCP). The eNB 160 may also process 2104 data packets for transmission according to Transmit MAC and RLC protocols. The transmit MAC and/or RLC frame structure and/or PDCP frame structure may be different in formats than those from a receive MAC and/or RLC frame structure and/or PDCP frame structure. This may be accomplished as described in connection with FIG. 20.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
   a processor configured to generate an uplink Medium Access Control (MAC) protocol data unit (PDU) of a MAC sublayer;
   a transmitter configured to transmit the uplink MAC PDU; and a receiver configured to receive a downlink MAC PDU of the MAC sublayer, wherein
the uplink MAC PDU of the MAC sublayer has a difference in format from the downlink MAC PDU of the MAC sublayer, wherein the difference is a difference in positional relation of a MAC sub-PDU(s) including a MAC control element(s) (MAC CE(s)) with respect to MAC service data units (MAC SDUs),
the format of the downlink MAC PDU is a format in which MAC sub-headers with Logical Channel ID (LCID) fields are interlaced with the MAC SDUs,
the uplink MAC PDU includes (a) a Radio Link Control (RLC) PDU which includes a segment of an RLC SDU and (b) information indicating whether the segment includes the first byte of the RLC SDU, and
the uplink MAC PDU is generated such that an RLC header of the RLC PDU is placed before the segment.

2. The UE of claim 1, wherein the format of the uplink MAC PDU is such that the MAC sub-PDU(s) is/are placed after the MAC SDUs, and the format of the downlink MAC PDU is such that the MAC sub-PDU(s) is/are placed before the MAC SDUs.

3. A base station, comprising:
a processor configured to generate a downlink Medium Access Control (MAC) protocol data unit (PDU) of a MAC sublayer;
a transmitter configured to transmit the downlink MAC PDU; and
a receiver configured to receive an uplink MAC PDU of the MAC sublayer, wherein
the uplink MAC PDU of the MAC sublayer has a difference in format from the downlink MAC PDU of the MAC sublayer, wherein the difference is a difference in positional relation of a MAC sub-PDU(s) including a MAC control element(s) (MAC CE(s)) with respect to MAC service data units (MAC SDUs),
the format of the downlink MAC PDU is a format in which MAC sub-headers with Logical Channel ID (LCID) fields are interlaced with the MAC SDUs,
the uplink MAC PDU includes (a) a Radio Link Control (RLC) PDU which includes a segment of an RLC SDU and (b) information indicating whether the segment includes the first byte of the RLC SDU, and
the uplink MAC PDU is such that an RLC header of the RLC PDU is placed before the segment.

4. The base station of claim 3, wherein the format of the uplink MAC PDU is such that the MAC sub-PDU(s) is/are placed after the MAC SDUs, and the format of the downlink MAC PDU is such that the MAC sub-PDU(s) is/are placed before the MAC SDUs.

5. A method performed by a user equipment (UE), comprising:
generating an uplink Medium Access Control (MAC) protocol data unit (PDU) of a MAC sublayer;
transmitting the uplink MAC PDU; and
receiving a downlink MAC PDU of the MAC sublayer, wherein
the uplink MAC PDU of the MAC sublayer has a difference in format from the downlink MAC PDU of the MAC sublayer, wherein the difference is a difference in positional relation of a MAC sub-PDU(s) including a MAC control element(s) (MAC CE(s)) with respect to MAC service data units (MAC SDUs),
the format of the downlink MAC PDU is a format in which MAC sub-headers with Logical Channel ID (LCID) fields are interlaced with the MAC SDUs,
the uplink MAC PDU includes (a) a Radio Link Control (RLC) PDU which includes a segment of an RLC SDU and (b) information indicating whether the segment includes the first byte of the RLC SDU, and
the uplink MAC PDU is generated such that an RLC header of the RLC PDU is placed before the segment.

6. A method performed by a base station, comprising:
generating a downlink Medium Access Control (MAC) protocol data unit (PDU) of a MAC sublayer;
transmitting the downlink MAC PDU; and
receiving an uplink MAC PDU of the MAC sublayer, wherein
the uplink MAC PDU of the MAC sublayer has a difference in format from the downlink MAC PDU of the MAC sublayer, wherein the difference is a difference in positional relation of a MAC sub-PDU(s) including a MAC control element(s) (MAC CE(s)) with respect to MAC service data units (MAC SDUs),
the format of the downlink MAC PDU is a format in which MAC sub-headers with Logical Channel ID (LCID) fields are interlaced with the MAC SDUs,
the uplink MAC PDU includes (a) a Radio Link Control (RLC) PDU which includes a segment of an RLC SDU and (b) information indicating whether the segment includes the first byte of the RLC SDU, and
the uplink MAC PDU is such that an RLC header of the RLC PDU is placed before the segment.

* * * * *